Jan. 5, 1932.  S. BRAND  1,839,371
CASH REGISTER
Filed Sept. 8, 1927  13 Sheets-Sheet 1

Inventor
Samuel Brand
By Carl Beust
Henry E Stauffer
His Attorneys

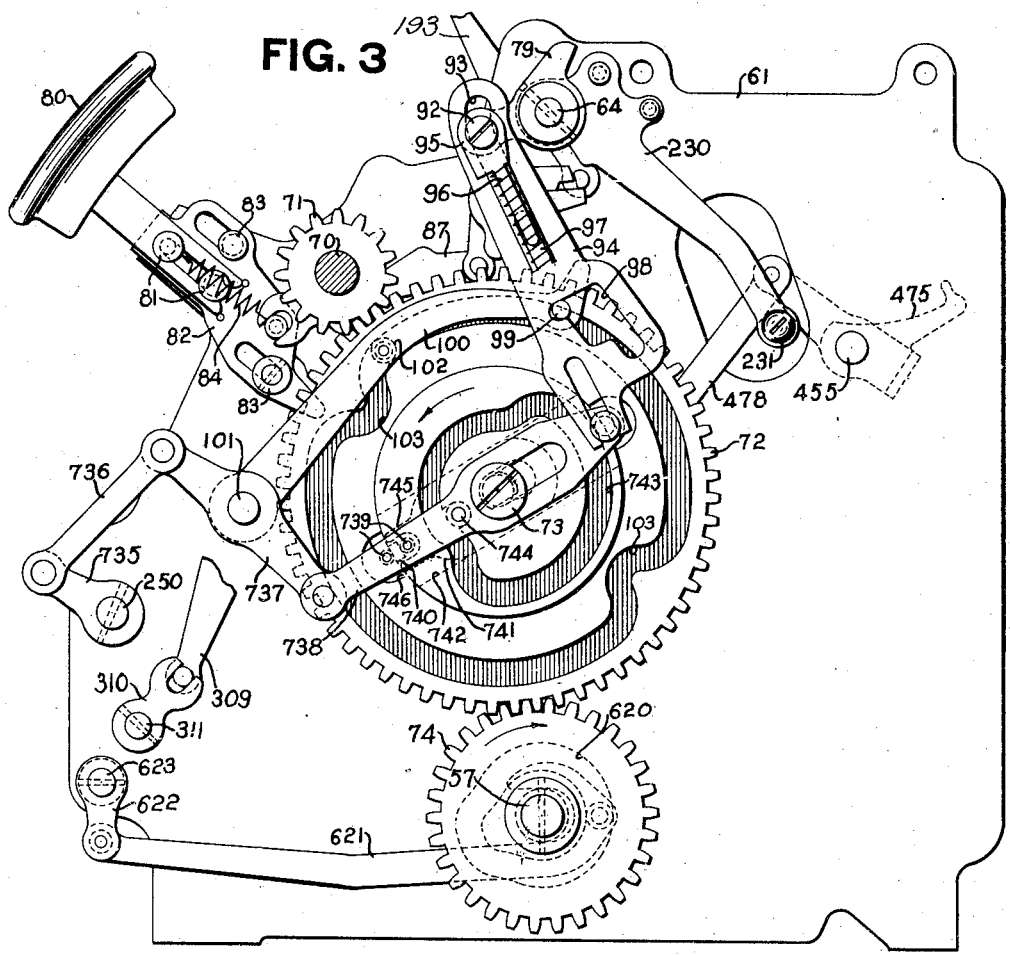

Jan. 5, 1932. S. BRAND 1,839,371
CASH REGISTER
Filed Sept. 8, 1927 13 Sheets-Sheet 3

Jan. 5, 1932.  S. BRAND  1,839,371
CASH REGISTER
Filed Sept. 8, 1927  13 Sheets-Sheet 4

Inventor
Samuel Brand
By Carl Beust
Henry E. Stauffer
His Attorneys

Jan. 5, 1932.    S. BRAND    1,839,371
CASH REGISTER
Filed Sept. 8, 1927    13 Sheets-Sheet 5

Inventor
Samuel Brand
By Carl Beust
Henry E. Stauffer
His Attorneys

Jan. 5, 1932. S. BRAND 1,839,371
CASH REGISTER
Filed Sept. 8, 1927 13 Sheets-Sheet 6

Inventor
Samuel Brand
By Carl Beust
Henry E Stauffer
His Attorneys

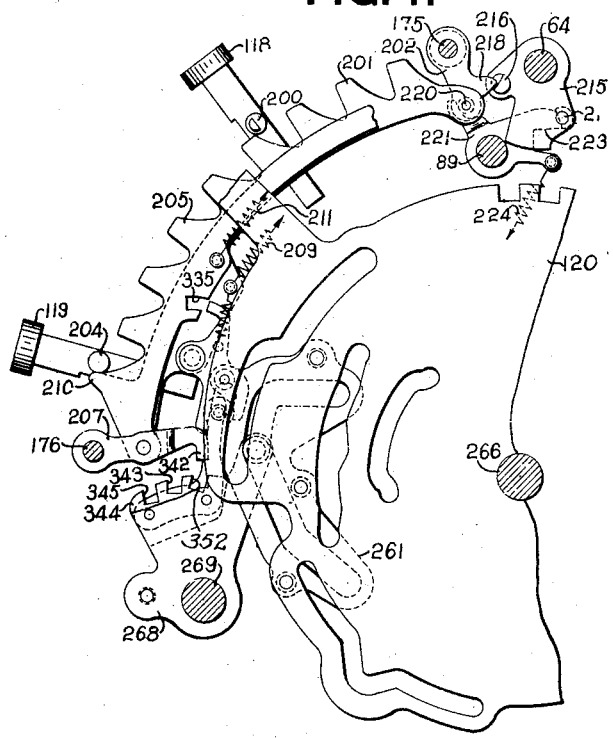

Jan. 5, 1932. S. BRAND 1,839,371
CASH REGISTER
Filed Sept. 8, 1927 13 Sheets-Sheet 9

Inventor
Samuel Brand
By
His Attorneys

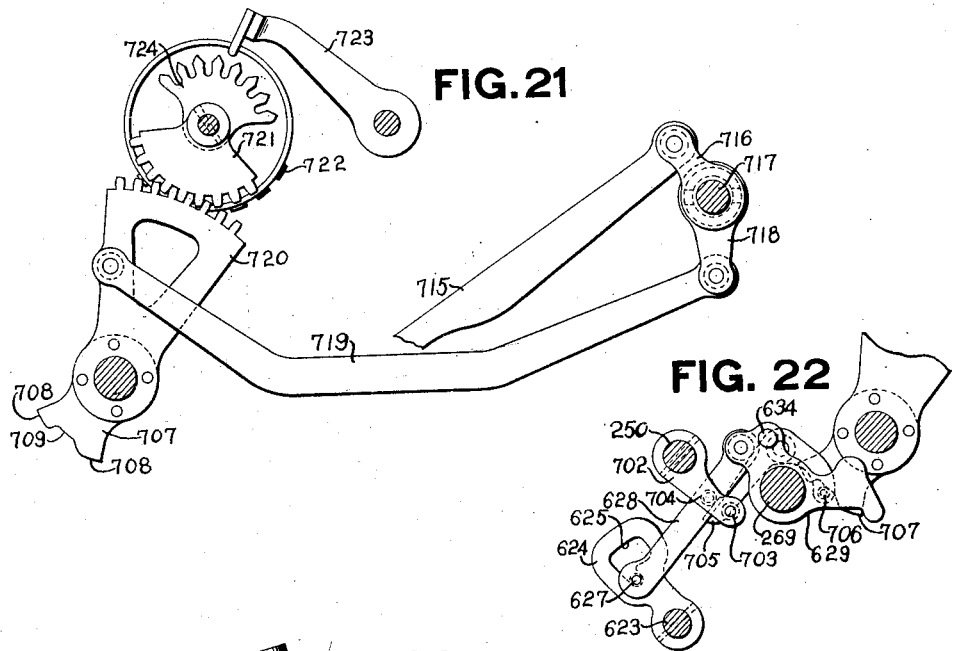
FIG. 21
FIG. 22
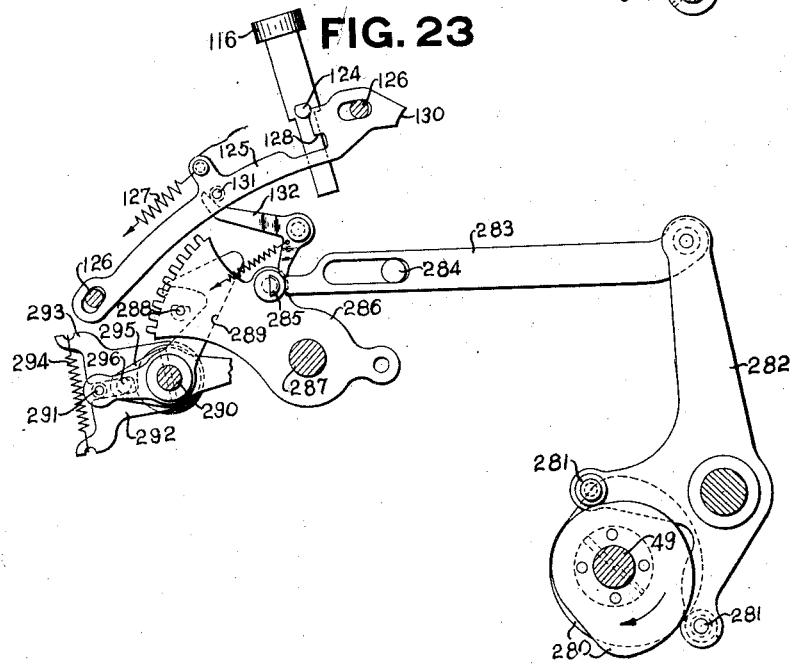
FIG. 23

Jan. 5, 1932.  S. BRAND  1,839,371

CASH REGISTER

Filed Sept. 8, 1927  13 Sheets-Sheet 11

Inventor
Samuel Brand
By Carl Benst
Henry E Stauffer
His Attorneys

Jan. 5, 1932.  S. BRAND  1,839,371
CASH REGISTER
Filed Sept. 8, 1927   13 Sheets-Sheet 12

Inventor
Samuel Brand
By Earl Berst
Henry E. Stauffer
His Attorneys

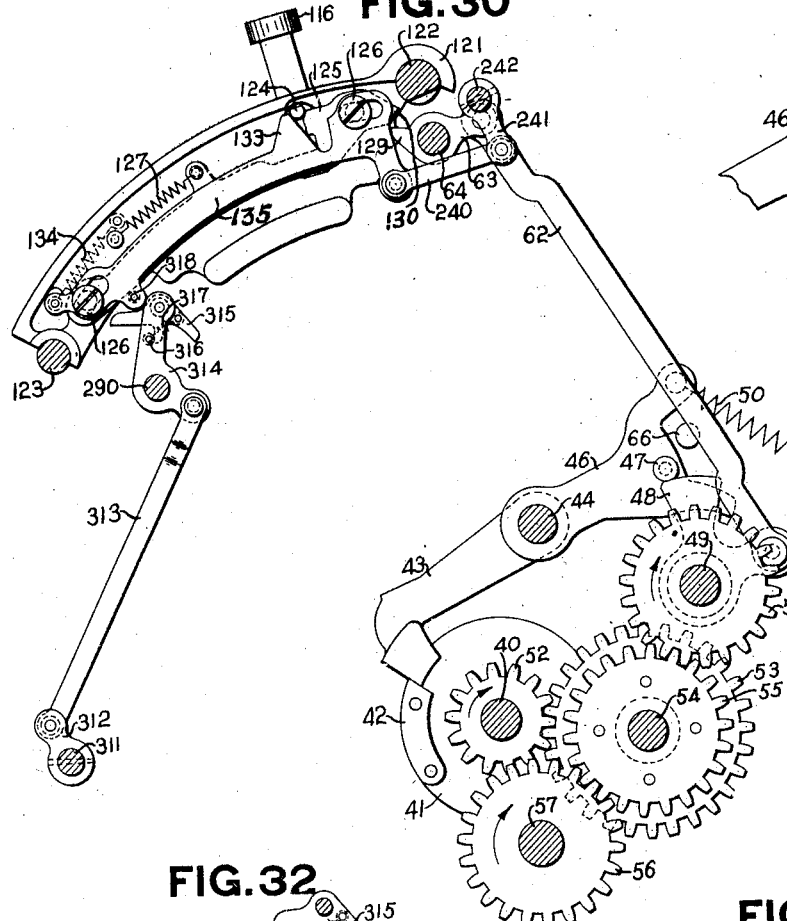
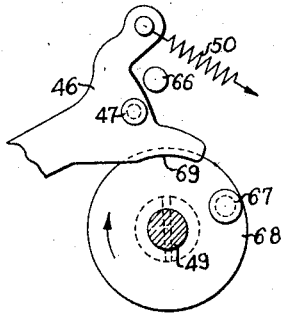
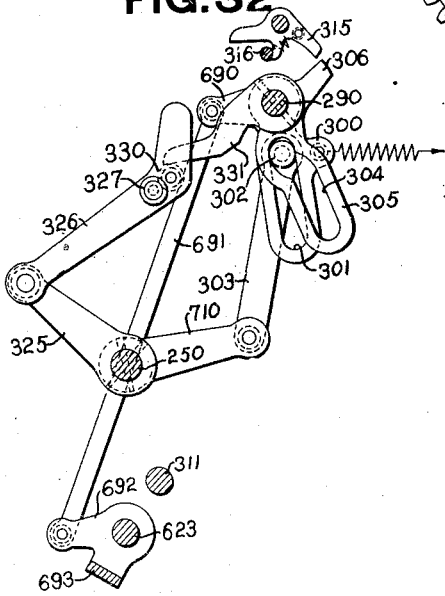
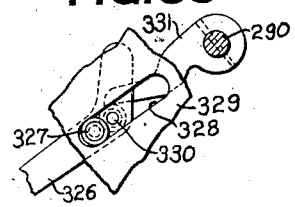

Patented Jan. 5, 1932

1,839,371

UNITED STATES PATENT OFFICE

SAMUEL BRAND, OF DAYTON, OHIO, ASSIGNOR TO THE NATIONAL CASH REGISTER COMPANY, OF DAYTON, OHIO, A CORPORATION OF MARYLAND

CASH REGISTER

Application filed September 8, 1927. Serial No. 218,200.

This invention relates to cash registers, and particularly to the type illustrated and described in the applications for Letters Patent of the United States, Serial Numbers 608,281 and 687,305, filed by Bernis M. Shipley on December 21, 1922, and January 19, 1924, respectively.

The machines of these two Shipley applications and the present application are based on machines of the general type illustrated and described in Letters Patent of the United States No. 1,230,864, granted to W. A. Chryst on June 26, 1917 and Nos. 1,242,170 and 1,394,256, granted to F. L. Fuller on October 9, 1917 and October 18, 1921, respectively; and also No. 1,619,796, granted to Bernis M. Shipley on March 1, 1927.

An object of this invention is to produce a machine of the type illustrated and described in the above mentioned Shipley applications, said machine having a divided bank of keys and special or rotation counters, so arranged and controlled by the divided bank of keys that the proprietor may, at any time he desires, obtain the true number of the various kinds of transactions which have been entered in the machine. By the use of these counters the proprietor may also obtain the average amount of each sale.

Other objects of the present invention are to provide:

A novel differential mechanism, associated with one of the groups of keys in the divided bank, for setting indicators and printers and for selecting totalizers.

A plurality of special counters, associated with the keys in the divided bank, and novel devices for determining whether certain counters shall be operated after they have been selected by said keys. These counters are divided into as many groups as there are groups of keys in the divided bank.

Novel selecting mechanism for the special counters.

Novel devices controlled by the item key for preventing operation of a counter, notwithstanding that it has been selected for operation.

Novel means operated by the total lever for preventing operation of a counter after it has been selected for operation.

Means intermediate the selecting means for one group of counters and the selecting means for another group of counters for causing one of the selecting means to be ineffective.

Another group of special counters with a novel selecting mechanism therefor.

A novel device associated with the selecting means for the last mentioned group of counters and controlled by the above mentioned intermediate means for preventing operation of a selected counter in the latter group, when one of the first two mentioned selecting means is rendered ineffective.

A novel adjustable device for operating the counter operating plate, said device having a flexible connection to its controlling means.

A novel device controlled by the total lever for coupling together two controlling bars of the divided bank whereby both bars will be moved upon depression of a key in either group to release the machine.

A totalizer for accumulating the items of a multiple item transaction, and a special engaging controlling means for said totalizer controlled by the item key.

With these and incidental objects in view, the invention consists of certain novel features of construction and combinations of parts, the essential elements of which are set forth in appended claims, and a preferred form of embodiment of which is hereinafter described with reference to the drawings which accompany and form part of this specification.

Of said drawings:

Fig. 3 shows the main operating mechanism of the machine.

Fig. 4 is a detail of the machine release mechanism.

Fig. 11 shows particularly, the divided bank controlling bars, and how they cooperate to release the machine for operation.

Fig. 12 is a detail of the coupling device for the controlling bars of the divided bank.

Fig. 13 shows the two flexible detents of the divided bank, and a portion of the lockout mechanism.

Fig. 14 is a fragmentary detail showing the manual releasing means for the upper group of keys of the divided bank.

Fig. 15 is a fragmentary detail view showing the manual release for the lower group of keys of the divided bank.

Figure 17:
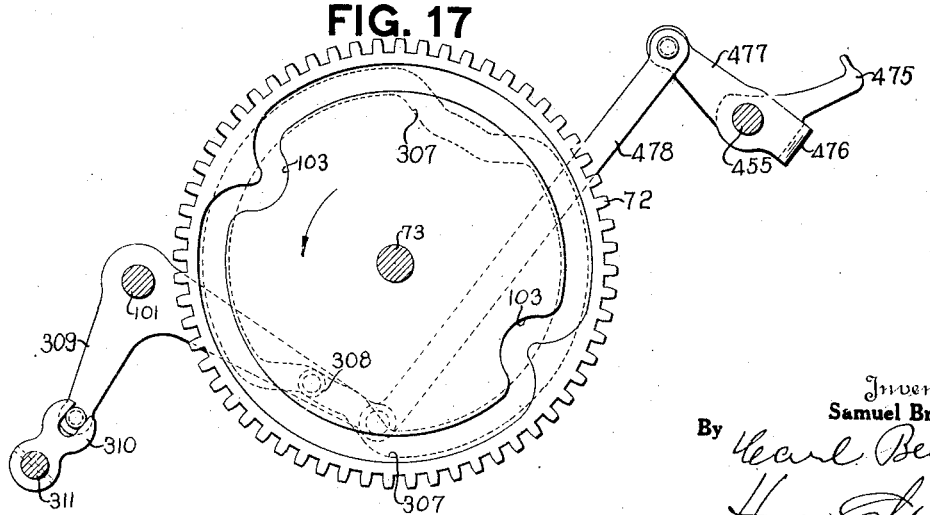

Fig. 17 shows the cam device for operating the aligner associated with the upper group of keys of the divided bank. The cam for operating the key release mechanism is also shown. The groove in which the "two cycle" cam rests is omitted.

Figure 18:
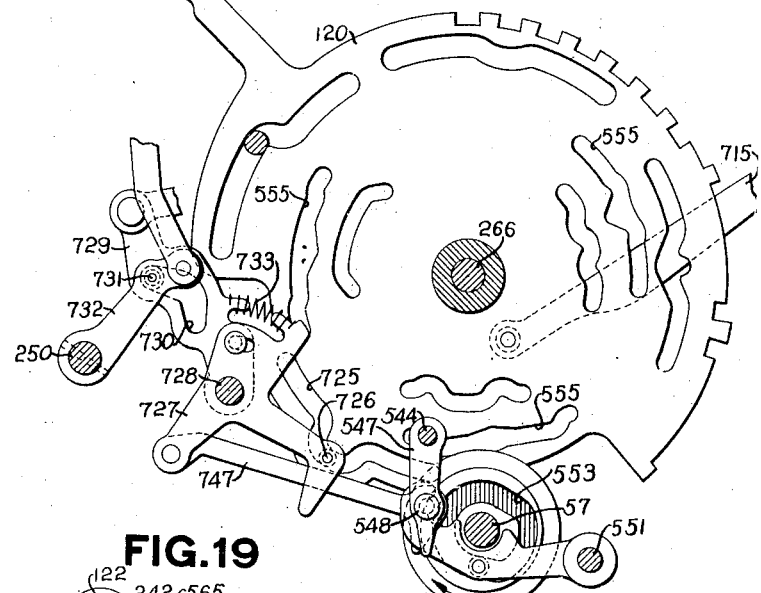

Fig. 18 shows the total lever and a portion of the mechanism operated thereby, for causing the main cam shaft to make two cycles of movement instead of one.

Figure 19:
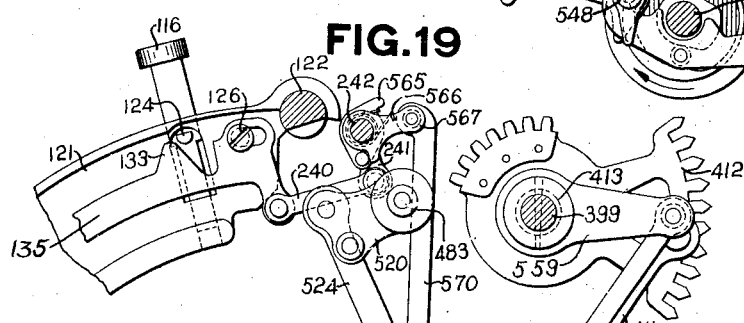

Fig. 19 shows the totalizer engaging controlling mechanism.

Figure 20:
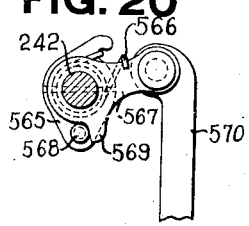

Fig. 20 is a detail of the flexible connection for operating the item totalizer selecting arm.

Fig. 21 shows the means for setting the "X" and "Z" type wheel by the total lever.

Fig. 22 shows the control, by the total lever, of the special counter operating means.

Fig. 23 shows the item key releasing mechanism.

Figure 24:
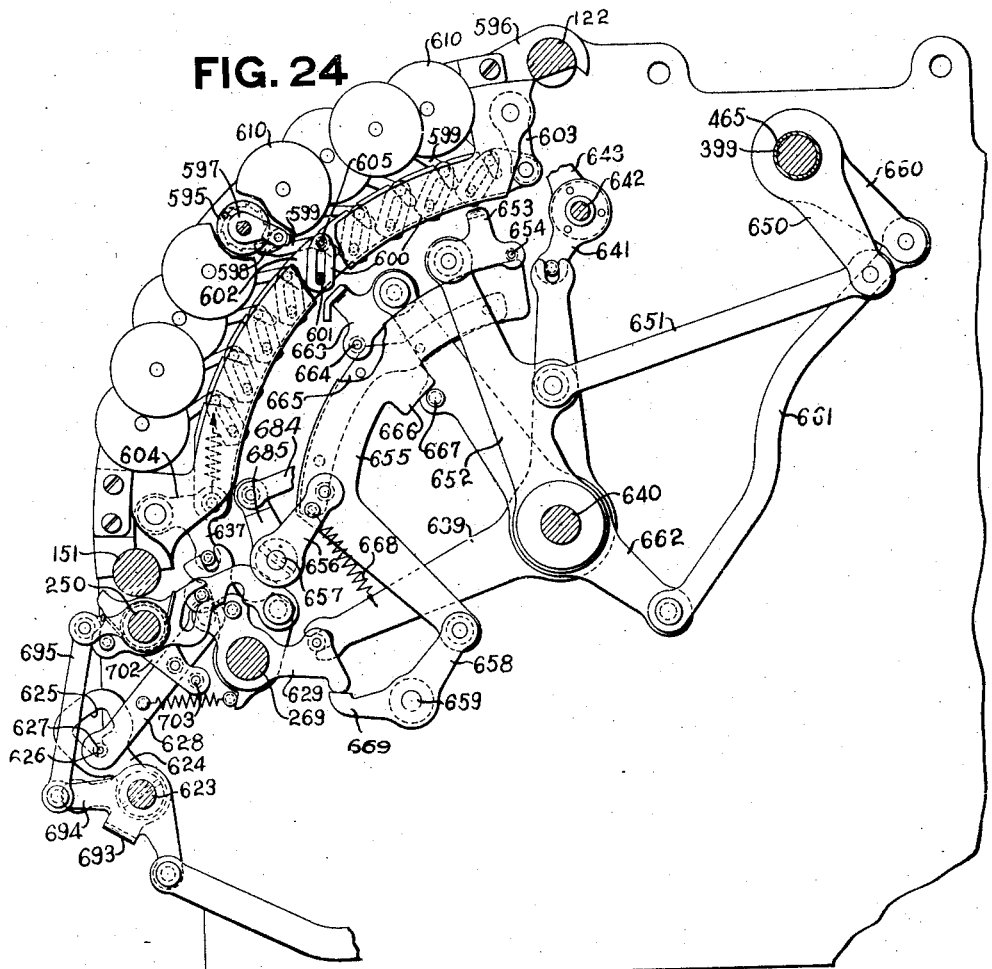

Fig. 24 shows the special counters associated with the divided bank, and the selecting and operating mechanisms therefor.

Figure 25:
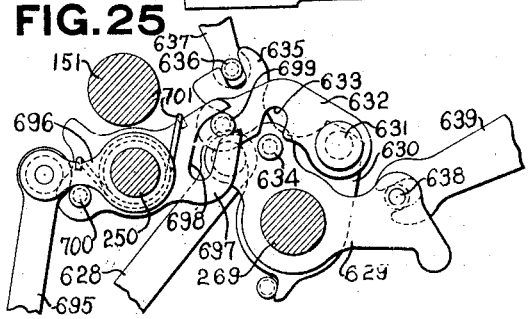

Fig. 25 is an enlarged detail of a portion of the control for the special counter operating means.

Figure 26:
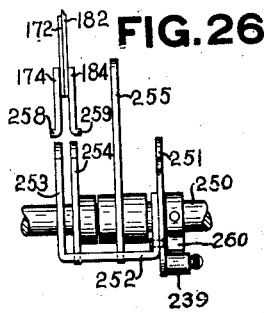

Fig. 26 is an edge view of the locking mechanism associated with the divided bank detents.

Figure 27:
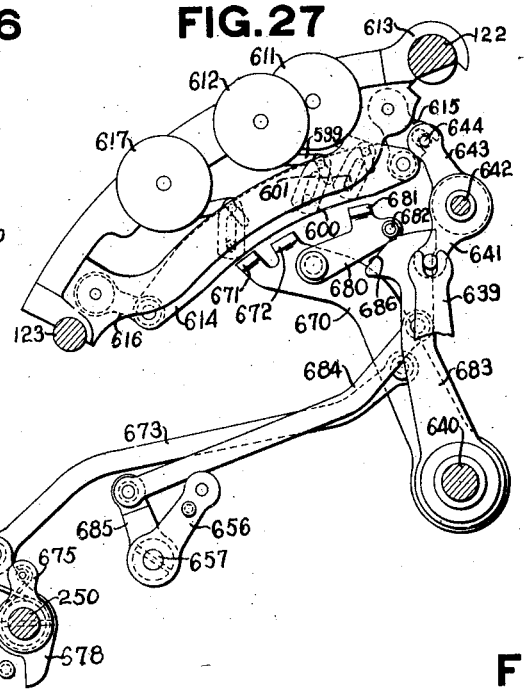

Fig. 27 shows another group of special counters, and the selecting and operating mechanisms therefor.

Figure 28:
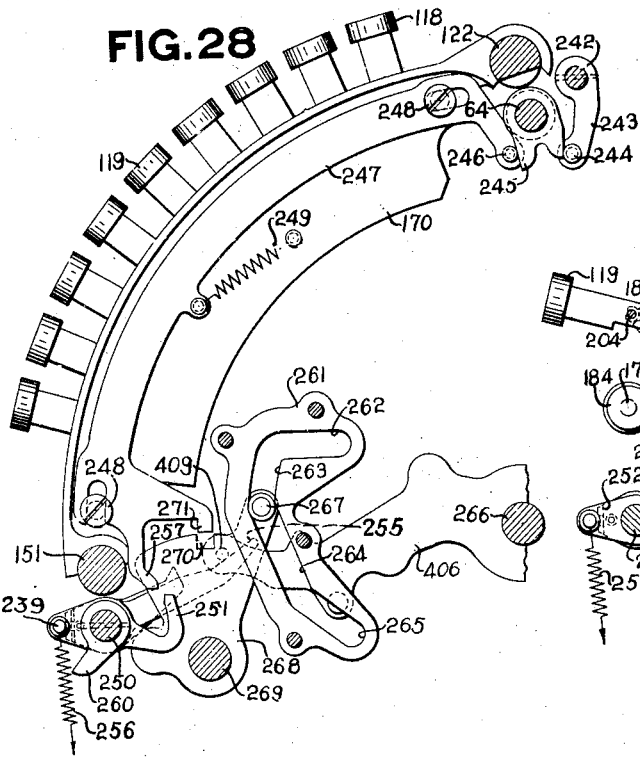

Fig. 28 shows the interlocking control bar operated by the item key, and also illustrates a portion of the mechanism for locking the flexible detent of the divided bank, when the item key is depressed.

Figure 29:
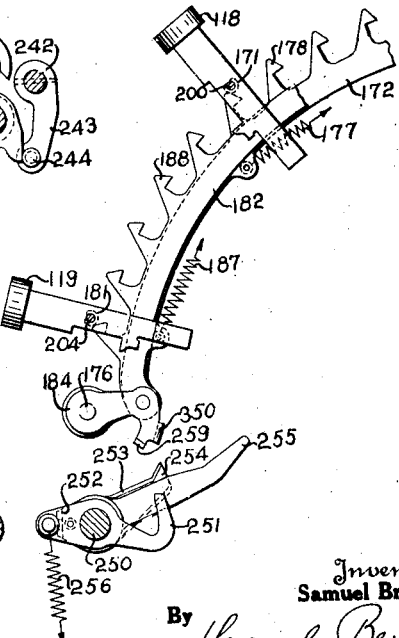

Fig. 29 shows the flexible detents for the divided bank, and a portion of the mechanism for locking them when the item key is depressed.

Fig. 30 shows the item key bank and its connection to the clutch release mechanism.

Fig. 31 is a detail of the clutch arm restoring device.

Fig. 32 shows a portion of the special counter controlling mechanism, which operates in conjunction with the item key and the total lever.

Fig. 33 is a detail of a portion of the special counter controlling mechanism shown in Fig. 32.

General description

The machine illustrated and described in this application is of the same general type as those illustrated in the above mentioned Shipley applications. This machine embodies all of the features set forth in the objects of the invention.

Described in general terms, the machine has three totalizer lines. The front line has four clerks' totalizers, the rear line has four transaction totalizers, and the upper line has a multiple item transaction totalizer.

To control the addition of amounts, there are four banks of amount keys, which, through differential mechanism like that illustrated and described in the above mentioned Chryst patent, cause the totalizers to have accumulated therein the amounts as determined by the values of the keys which are depressed.

To control the selection of the totalizers on the front and back totalizer lines, there is a bank of keys known in the art as a divided bank, consisting of four clerks' keys and five transaction keys. Each of these groups of keys controls a differential mechanism used to select totalizers, indicators and printing mechanism.

There are five transaction special counters; four clerks' special counters; one item special counter; one item total special counter; and one total transaction special counter.

These special counters are so arranged and controlled, that the proprietor may at any time he desires, obtain the true number of the various kinds of transactions which have been entered in the machine.

There is also mechanism for taking totals and subtotals from the clerks' and transaction totalizers.

This totalizing mechanism also controls the means for taking the item totals.

The operating mechanisms for the special counters have special controls, so that during a multiple item transaction, the item and the total transaction counters are permitted to count, but the other individual transaction counters selected during these operations of accumulating multiple items are rendered ineffective.

When the total is taken of the multiple items, which operation is necessary to complete a multiple transaction before an item of a single item transaction can again be entered in the machine, the counter controlling mechanism prevents operation of the item and total transaction counters and permits operation of the individual transaction and clerks' counters selected during the entry of the multiple items.

During cash and charge multiple item operations, the selected clerk's counter is operated but once. During cash and charge single item operations, the cash, charge, item and total transaction counters are each operated once. During a received-on-account, paid-out, or no-sale operation, each of these respective counters and the total transaction counter is operated once and the selected clerk's counter and item counter are rendered ineffective.

During a single item operation, in order to release the machine for operation, it is necessary to depress one of the clerk's keys and one of the transaction keys if the transaction is not like the the preceding one and the clerk is different in the divided bank and then operate the motor bar.

During a multiple item operation, it is necessary to first depress the item key and then one of the clerks' keys and also one of the transaction keys, after which the motor bar must be operated. During multiple item transactions the item key is retained in depressed position until the total of these items has been obtained.

To obtain the total of the items, the total lever is moved to the "item total" position, which is the first position below the adding position. During this item total operation the item key is permitted to return to normal position, thus putting the machine in condition to be operated again, either for another multiple item transaction or a single item transaction. After the entry of single item transactions it is not necessary to take any totalizing operation.

The clerks' keys and transaction keys are what are known in this art as "flexible" keys, and are not released by the machine at the end of any operation. The depression of one clerk's key releases another clerk's key, and the depression of one transaction key releases another transaction key. There is also provided a manually operated lever to release both clerks' and transaction keys when it is so desired.

Operating mechanism

The motor which it is desired to use with this machine, to operate the same, is of the well known type illustrated and described in Letters Patent of the United States No. 1,144,418, granted to Charles F. Kettering and William A. Chryst on June 29, 1915. For a detailed description of the same, reference may be had to this patent. Only a part of the motor clutch mechanism is shown in this case.

Mounted on a stud 40 (Fig. 30) is a spring actuated clutch disk 41, carrying a block 42, normally contacting a lever 43, pivoted on a stud 44, mounted in the machine frame.

Integral with the lever 43 is an arm 46, carrying a pin 47 contacting a stop arm 48 pivoted on the regular printer driving shaft 49. The pin 47 is held in contact with the arm 48 by a spring 50.

Secured to the regular motor clutch (not shown) is a driving gear 52 meshing with the gear 53 mounted on a stud 54 on the machine frame. Secured to the gear 53 is a gear 55, meshing with a gear 56 secured to a main cam shaft 57. The gear 55 also meshes with a gear 58 fastened to the shaft 49.

Upon release of the lever 43 from the block 42, the gear 52 through the motor clutch (not shown) rotates the shafts 49 and 57 (once) for each adding operation of the machine.

Figure 5:
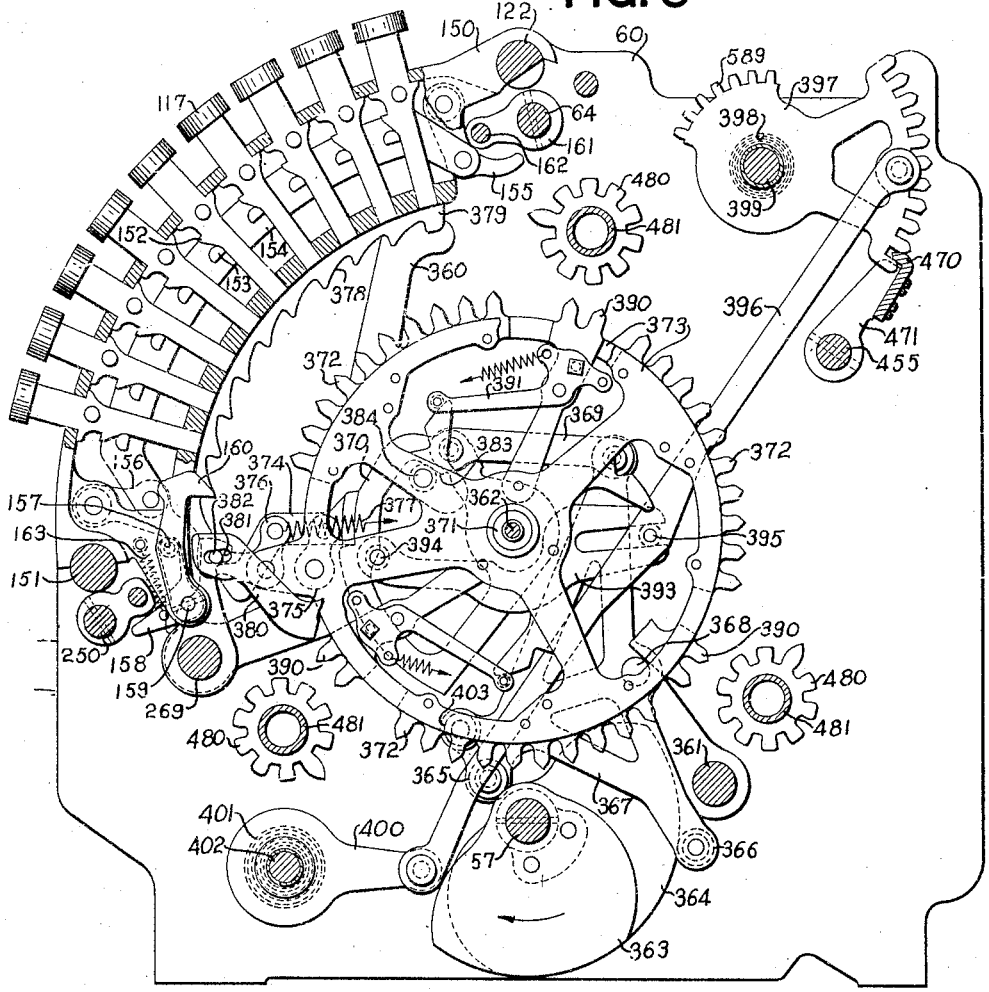
Fig. 5 is a section taken alongside one of the amount banks, and shows the differential mechanism therefor.

The shafts 49 and 57 are supported by side frames 60 (Fig. 5) and 61 (Fig. 3).

Pivoted to an extension of the stop arm 48 is a link 62 pivoted to an arm 63 secured to a shaft 64 mounted in the frames 60 and 61.

When the shaft 64 is rocked clockwise to release the machine, as will be hereinafter described, the stop arm 48 is withdrawn from beneath the pin 47, thus permitting the spring 50 to withdraw the lever 43 from the block 42. Clockwise movement of the lever 43 and arm 46 is limited by a pin 66 (Fig. 30) mounted in the machine frame.

Upon release of the lever 43 the clutch disk 41 is moved clockwise by a spring (not shown) causing an effective connection between the motor and this disk 41 to operate the machine through the gear 52.

Near the end of the operation, the lever 43 is restored to normal position by a pin 67 on a disk 68 secured to the shaft 49 (Fig. 31). This pin 67 at the proper time, engages an edge 69 of the arm 46, thus rocking this arm and the lever 43 counter-clockwise to move the lower end of the lever 43 into the path of the block 42 on the clutch disk 41 to stop the machine.

Means are also provided for operating the machine by hand instead of by motor. Pivoted on a stud 70 (Fig. 3) on the frame 61 is a handle operated gear 71 meshing with a gear 72 pivoted on a stud 73. The gear 72 meshes with a gear 74, secured to the shaft 57. The ratio of the gears 71, 72 and 74 is such that two clockwise rotations of the gear 71 rotates the gear 72 a half turn and the gear 74 and shaft 57 a full turn.

Machine release during item entering operations

Figure 1:
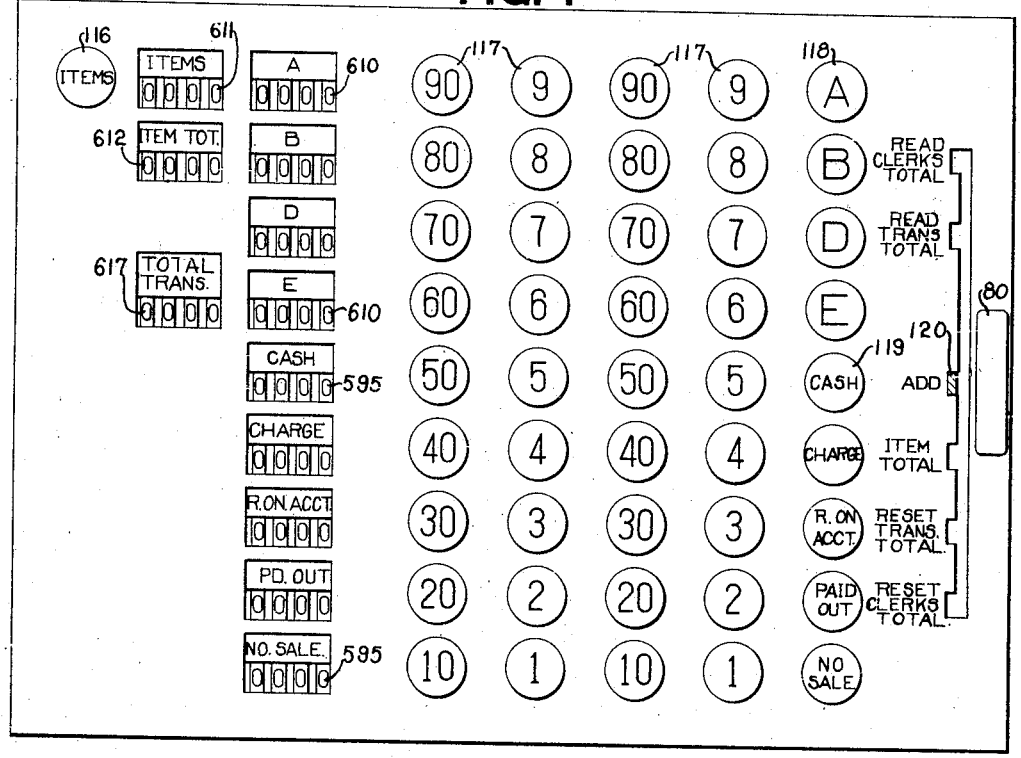
Fig. 1 is a diagrammatic view of the keyboard and the special counters.

After the desired amount, clerk's and transaction keys have been depressed for a single item transaction, and in addition, the item key for a multiple item transaction, the machine is finally released for operation by the depression of a motor bar 80 (Figs. 1, 3 and 4). This bar is detachably mounted on studs 81 on a slide 82 supported and guided by studs 83 on the frame 61. The bar 80 is retained in its normal or outer position by a spring 84. A pin 85 on the slide 82 is engaged by a forked arm 86 pivoted on the stud 70. The arm 86 is connected by a link 87 to a bell crank 88 pivoted on a shaft 89 supported by the frames 60 and 61.

The upper arm of the bell crank 88 lies in the path of a pin 90 on an arm 91 fastened to the shaft 64. There is a slight clearance between the bell crank 88 and the pin 90, for a purpose to be hereinafter described. Also secured to the shaft 64 is an arm 79 (Fig. 3) having a stud 92 projecting into a slot 93 in a link 94. The stud 92 carries two spring pilots 95 (one only shown) which, in conjunction with a tongue 97 of the link 94, guide a compression spring 96.

Depression of the motor bar 80 (Fig. 4) through the arm 86 and link 87 moves the bell crank 88 from in front of the pin 90. The spring 96 (Fig. 3) then rocks the arm 79 and shaft 64 clockwise, which, through the arm 63 and link 62, (Fig. 30) removes the stop arm 48 from the pin 47, and the spring 50 rocks the lever 43, to release the motor clutch disk 41 so that the driving gear 52 can function to operate the machine.

Near the end of the operation, the shaft 64 is rocked counter-clockwise beyond normal position by the link 94, which is lowered to cause the upper end of the slot 93 in the link 94 to strike the stud 92. This movement of the shaft 64 beyond its normal position is for the purpose of releasing the depressed amount keys, so that said keys may be restored to normal positions by the usual key springs (not shown). Thereafter the link 94 is again raised, which latter movement permits the shaft 64 to return to normal position by the action of the spring 96. The link 94 also has an opening 98 (Fig. 3) having an offset into which projects a pin 99 on a lever 100, pivoted on a stud 101 on the frame 61. The lever 100 has a roller 102 cooperating with a cam 103 in the gear 72, and this cam 103 rocks the lever 100 clockwise to lower and raise the link 94 as above described.

Since this gear 72 makes a half rotation only, during adding operations, there are two cams 103 either of which rocks the lever 100 for the purposes above mentioned.

To prevent repeat operations when the motor bar is held depressed during the entire operation, there is provided a non-repeat pawl 110 (Fig. 4) held against a projection 111 on the bell crank 88 by a spring 112. When the shaft 64 is moved counter-clockwise past its normal position shown in Fig. 4, the spring 112 rocks the non-repeat pawl 110 so that it again engages the projection 111, they having been separated when the machine was released as the pin 90 moved between the bell crank 88 and the pawl 110. This rocking of the non-repeat pawl 110 positions it in front of the pin 90 thus preventing any clockwise movement of the shaft 64 which movement is necessary to release the machine for operation. When pressure is removed from the motor bar 80 the spring 84 returns the bell crank 88 and non-repeat pawl 110 to the position shown in Fig. 4.

Keyboard

The keyboard includes one "item" key 116, four banks of amount keys 117, a divided bank of keys comprising four clerks' keys 118 and five transaction keys 119, and a total lever 120.

Keyboard—item key

The "item" key 116 is mounted in a frame 121 (Figs. 19 and 30) mounted on a rod 122 supported by the frames 60 and 61, and a rod 123 supported by the frame 60 and the printer frame (not shown). The key 116 has a pin 124, which cooperates with a detent 125 (Figs. 23 and 30) mounted on screw studs 126 on the frame 121. A spring 127 holds the detent 125 normally in contact with the pin 124. Depression of the key moves the detent 125 to the right until the key is fully depressed, whereupon the spring 127 moves the detent to the left and a shoulder 128 of the detent 125 holds the key depressed.

This key 116 must be either fully depressed or fully released before the machine can be released for operation.

Therefore, the arm 63 has a projection 129 (Figs. 23 and 30) which cooperates with a projection 130 on the detent 125. When the key 116 is either fully released or fully depressed the projection 129 will pass the projection 130, as the shaft 64 is rocked clockwise upon the release of the machine. However, should the key 116 be in a partially depressed position, the projection 130 would then overlie the projection 129, thus preventing any movement of the shaft 64, and consequently prevent the release of the machine.

This key 116 is depressed at the beginning of a multiple item transaction only. For each item sold, of a multiple item transaction, the shaft 57 is rotated once and the machine goes through an operation. At the end of these various operations of a multiple item transactions, the key 116 is not released, but is held depressed until the item total of the several items is taken.

The detent 125 has a pin 131 cooperating with a restoring lever 132.

At the proper time during an item total operation, and in a manner to be hereinafter described, the lever 132 is rocked clockwise thus disengaging the shoulders 128 of the detent 125 from the pin 124 and permitting the regular key spring (not shown) to restore the "item" key 116 to its normal position.

The "item" key 116 also cooperates with a projection 133, (Fig. 30) the purpose of which will be hereinafter described. This bar 135 is slidably mounted upon the studs 126 and the projection 133 is normally held against the pin 124 by a spring 134.

Keyboard—amount keys

The amount key banks used in this machine are substantially identical with those illustrated and described in the above mentioned Chryst, Fuller and Shipley patents. Therefore, but a brief description thereof will be necessary here.

The keys 117 are supported by a frame 150 (Fig. 5) mounted on the rod 122 and a rod 151 also supported by the side frames 60 and 61. The keys have shoulders 152 cooperating with pins 153 on a detent 154, supported by arms 155 and 156 pivoted on the frame 150.

The arm 156 normally engages a pin 157 on an arm 158 fastened to a short shaft 159 mounted in the frame 150. Also secured to the shaft 159 is a zero stop pawl 160, which cooperates with the amount differential mechanism, to be later described, to stop said mechanism in its zero position when a key is not depressed in that particular bank. Depression of a key 117 lowers the detent 154, whereby the arm 156 rocks the pawl 160 to an ineffective position so that the differential mechanism may be controlled by said key. The key is retained in its depressed position by the pin 153 engaging the key stem on the top of the shoulder 152.

Near the end of the operation, whether it be a single item transaction, or one operation of a multiple item transaction, the keys 117 are released and restored to normal positions.

Secured to the shaft 64 (Fig. 5) are two arms 161 (only one of which is shown) carrying a rod 162 which cooperates with the detent arms 155. As the shaft 64 is rocked counter-clockwise by the cam 103 and lever 100 (Fig. 3) the rod 162 lowers all of the detents 154, whereupon the regular key springs (not shown) restore the depressed keys to their normal positions. At this time a spring 163 (Fig. 5) restores the pawl 160 to normal position, so that, if during the next operation a key in that particular bank should not be depressed, the differential mechanism would be stopped in the zero position.

Keyboard—divided bank

The divided bank includes two groups of keys 118 and 119, known in the art as "stay-down" keys, supported by a frame 170 (Figs. 6, 8 and 10) supported on the rods 122 and 151.

Each key 118 has on its left hand side a pin 171 (Figs. 13 and 29) which cooperates with a detent 172 supported by arms 173 and 174 (Fig. 14) pivoted upon studs 175 and 176 respectively mounted in the frame 170. A spring 177 (Fig. 13) normally holds shoulders 178 on the detent 172 in contact with the pins 171.

Each key 119 has on its left side a pin 181 (Fig. 13) cooperating with a detent 182 supported by arms 183 and 184 pivoted on the studs 175 and 176 respectively. A spring 187 normally holds shoulders 188 on the detent 182 in contact with the pins 181.

When a key 118 is depressed, its pin 171 moves the detent 172 downwardly until the pin gets below the shoulder 178. The spring 177 then raises the detent and locks the key in depressed position. When a key 119 is depressed, its pin 181 moves the detent 182 downwardly until the pin 181 gets underneath the shoulder 188, whereupon the spring 187 raises this detent and retains this key 119 in depressed position.

To prevent clockwise movement of the shaft 64 (Fig. 13) to release the machine for operation, when any one of the keys 118 or 119 is partially depressed only, each arm 173 and 183 has a laterally turned lug 190 (Figs. 9, 13 and 14) which cooperates with fingers 191 on an arm 192 fastened to the shaft 64. When either of the keys 118 or 119 is partially depressed its respective lug 190 is in the path of movement of the fingers 191 thus preventing any movement of the shaft 64 to release the machine. When the keys are either fully depressed or fully released, the fingers 191 pass in front of the lugs 190.

The keys 118 and 119, as above mentioned, are of the "stay-down" type; that is, they are not released at the end of the operation of the machine as is the case with the amount keys. However, depression of another key 118 forces the detent 172 downwardly and withdraws the shoulder 178 from above the stud 171 to release the depressed key 118, so that there is never more than one key 118 depressed for any operation of the machine. Likewise, depression of any key 119 forces the detent 182 downwardly to release any key 119 which may be depressed, so that there is never more than one key 119 depressed for any operation.

There is provided, to release the clerks' keys 118 and transaction keys 119, a manually operable release lever 193 (Fig. 14) pivoted upon the shaft 64. This lever is connected by a yoke 194, to an arm 195 carrying a pin 196 which overlies both arms 173 and 183.

Counter-clockwise movement of the lever 193 (Figs. 14 and 15) rocks the arms 173 and 183 clockwise, which disengages the shoulders 178 and 188 from the pins 171 and 181 respectively thus permitting the regular key springs (not shown) to restore any depressed keys.

Each key 118 has a pin 200 on its right side (Figs. 8 and 11) which cooperates with a controlling bar 201 supported by arms 202 and 203 (Figs. 8 and 11) pivoted on the studs 175 and 176.

Each key 119 has on its right side a pin 204 (Figs. 10 and 11) which cooperates with a controlling bar 205 supported by arms 206 and 207 (Fig. 10) pivoted on the studs 175 and 176.

The bar 201 has a projection 208 (Fig. 8) normally held against the pin 204 in the lowermost key 119 by a spring 209. The bar 205 has a projection 210 (Fig. 11) held against the same pin 204 by a spring 211.

To enter a multiple item or a single item transaction, it is necessary to depress a clerk's key 118 and a transaction key 119.

The shaft 64 has secured thereto a retaining wall 215 (Figs. 8 to 11) having on one side a pin 216 and on the other side a pin 217.

The arm 202 (Fig. 11) for the clerks' bar 201 has a projection 218 lying in the path of movement of the pin 216. The arm 206 (Fig. 10) for the transaction bar 205 has a projection 219 also lying in the path of movement of the pin 216. There is a slight clearance between the pin 216 and each of these projections 218 and 219. The pivot pin 220 (Fig. 11) for the arm 202 and bar 201 is normally engaged by an arm 221 loosely mounted upon the shaft 89. This arm 221 has a projecting arm 223 normally contacting the pin 217. A spring 224 holds the arm 221 in engagement with the pin 220 and keeps the arm 223 in front of the pin 217.

The pivot pin 225 (Fig. 10) for the arm 206 and transaction bar 205 is engaged by an arm 226 loosely mounted upon the shaft 89. This arm is connected by a yoke 227 to an arm 228 normally in front of the pin 217. A spring 229 holds the arm 226 in engagement with the pin 225 and the arm 228 in front of the pin 217.

Should a clerk's key 118 be depressed and none of the transaction keys 119 be depressed, the projection 219 and arm 228 would remain in front of the pins 216 and 217 respectively thus preventing any movement of the retaining arm 215 and shaft 64, and consequently prohibiting the release of the machine by the motor bar 80. On the other hand should a transaction key 119 be depressed and none of the clerks' keys be depressed, then the projections 218 and 223 would remain in front of the pins 216 and 217 respectively, and in like manner prevent the release of the machine by depression of the motor bar 80.

However, when a key 118 and a key 119 are depressed, the clerk's and transaction controlling bars 201 and 205 are moved downwardly, thus removing the projections 218 and 219 from the pin 216, and causing the pins 220 and 225 to rock the arms 221 and 226 respectively, thus moving the arms 223 and 228 from the path of movement of the pin 217, which permits the shaft 64 to receive its clockwise movement upon depression of the motor bar to release the machine.

Should a key 118 be depressed and then released by striking another key 118 a quick, sharp blow, the partial depression of this other key would not be sufficient to cause it to be locked down by the shoulder 178 of the detent 172. But the arm 223 and projection 218 (Fig. 11) would both have been removed from the pins 217 and 216 respectively, by the depression of the first key 118. Then upon the release of this depressed key by the tapping of the other key, the projection 218 is again moved into the path of the pin 216 but the arm 223 is not moved into the path of the pin 217. If, with the parts in these positions, the motor bar 80 is depressed, the horizontal arm of the bell crank 88 (Fig. 4) is removed from the stud 90, and the spring 96 (Fig. 3) rocks the shaft 64 until the pin 216 (Fig. 11) strikes the projection 218. The clearance between the projection 218 and pin 216 is greater than the clearance between the pin 90 and bell crank arm. There is no clearance at all between the pin 217 and arm 223.

With the parts in the positions in which they are left after the motor bar has been depressed in the manner just described, the machine cannot be released, and it is necessary to rock the shaft 64 counter-clockwise to normal position by manual means before the machine can again be released for operation. This manual means includes a lever 230 (Fig. 3) having a handle 231 extending through the cabinet of the machine so that it may be grasped by the operator.

Should the keys 119 and motor bar be operated, in a manner as just described for the clerks' keys 118, then the projection 219 and arm 228 (Fig. 10) function in the same manner that the projecton 218 and arm 223 function, to prevent the release of the machine.

Should a key 118 be depressed very slowly just far enough to remove the arm 223 from the pin 217, and then be pulled out, after which the operator would depress the motor bar 80, the projection 218 would function in the same manner as before described, thus preventing the machine from being released.

*Keyboard—total lever*

The total lever 120 is used during multiple item transactions to control the machine to take the total fro the item totalizer. During other total and sub-total operations it is used to control the machine to take a total or

Multiple item transaction

When entering a multiple item transaction the amount keys 117, item key 116, a clerk's key 118 and a transaction key 119, are depressed. After the first item of a multiple item transaction has been entered, all items of this transaction must be entered into the totalizers associated with the keys 118 and 119 which have been depressed, and it is impossible to release the depressed keys 118 and 119, or depress any other key 118 or 119 before the total lever 120 has been operated to put the machine in condition to take the total from the item totalizer and that total taken.

The mechanism which requires the operator to take the item total after the several items of a multiple item transaction are entered will now be described.

The previously mentioned bar 135 (Fig. 30) is connected by a link 240 to an arm 241 fastened to a shaft 242 supported by the frames 60 and 61. Also secured to this shaft 242 is an arm 243 (Fig. 28) having a pin 244 normally contacting an arm 245 loosely mounted upon the shaft 64. The arm 245 is also contacted by a pin 246 on a sliding interlocking control bar 247 mounted upon screws 248. A spring 249 maintains the contact between the pin 246 and the arm 245.

Loosely mounted upon a shaft 250 (Figs. 26, 28 and 29) is an arm 251 connected by a yoke 252 to an arm 253. An arm 254 and a lever 255 are also connected to the yoke 252. The arms 251, 253 and 254 and the lever 255 rock as a unit. A spring 256 normally holds the lever 255 in contact with a stud 409 on an arm 406 of the transaction differential mechanism to be later explained. When this differential mechanism is rocked clockwise, during the entry of a single item transaction, the stud 409 is moved away from the lever 255, and the spring 256 rocks the arm 251 until the arm 251 strikes a toe 257 on the interlocking controlling bar 247. Therefore, the arms 253 and 254 move idly and do not function as they do in the manner to be later described, during the entry of multiple item transactions. As the differential arm 406 is rocked counterclockwise to its normal position, during the entry of a single item transaction, the pin strikes the lever 455 and rocks it, and the arms 451, 453 and 454 clockwise to their normal positions.

However, when the item key 116 is depressed at the beginning of the entry of a multiple item transaction, the movement of the bar 135, (Fig. 30) through the link 240, arm 241, shaft 242 and arm 243 rocks the arm 245 (Fig. 28) clockwise, thereby moving the interlocking control bar 247 downwardly, thus moving the toe 257 out of the path of movement of the arm 251, therefore the arm 251 and the lever 255 are moved counter-clockwise by the spring 256, greater distances than they are moved when the item key is not depressed. This greater distance is sufficient to position the free end of the lever 255 out of the path of movement of the stud 409 on the differential arm 406, and when said arm 406 is rocked counter-clockwise to its normal position, the stud 409 cannot strike the lever 255, and the arms 251, 253 and 254 and the lever 255 are left in their moved positions at the end of an operation, which enters one item of a multiple item transaction.

When the interlocking control bar 247 has been moved by depression of the item key 116, as above described the arms 253 and 254 are moved greater distances than they are moved when the key 116 is not depressed. When moved the greater distance these arms 253 and 254 are positioned directly beneath toes 258 and 259 respectively (Figs. 13, 14 and 26) on the arms 174 and 184, of the flexible detents 172 and 182 respectively.

When the arms 253 and 254 are underneath the toes 258 and 259 it is impossible to depress any keys 118 or 119 to release other keys 118 and 119 which have been depressed.

Therefore, it is necessary that the total lever 120 be moved to the "item total" position to take the item total of the multiple item transaction before another single transaction can be entered in the machine. Near the end of the item total operation the depressed item key 116 is released by means to be later described, thus permitting the interlocking control bar 247 to rise under the influence of its spring 249. During an item totalizing operation, by means to be hereinafter described, an arm 260 (Fig. 28) fastened to the shaft 250 is rotated clockwise to contact and move a pin 239 on the arm 251 to which the spring 256 is attached, thereby rotating the arms 253, 254, 251 and lever 255 clockwise to move the free end of the lever 255 into the path of movement of the stud 409 on the differential arm 406, so that when the differential mechanism is restored to normal position during the second cycle of the item total operation, the lever and arms mentioned will be restored to their normal positions by engagement of the stud 409 with the lever 255.

The total lever 120 has secured thereto a cam plate 261 (Figs. 11, 12 and 28). This plate has a cam slot having four portions 262, 263, 264 and 265. The portion 263 is concentric with the center of a rod 266 upon which the total lever pivots. Projecting within the portion 263 is a roller 267 on an arm 268 pivoted on a shaft 269. This arm 268 has a notch 270 (Fig. 28) entered by a projection 271 on the interlocking control bar 247 when the item key 116 is depressed. This prevents the total lever from being moved to any position except the item total position, after the items of a multiple item transaction have been entered in the machine.

Control of item key release

The mechanism for preventing the release of the item key 116 at the completion of each item entering operation of a multiple item transaction, and for releasing the item key 116 during the taking of the item total will now be described.

As will be hereinafter described, the shafts 57 and 49 (Figs. 23 and 30) are given two rotations during an item total operation, and in fact during all total and sub-total operations. The shaft 49 has secured thereto a pair of cams 280 cooperating with rollers 281 on a lever 282, which has pivoted thereto one end of a link 283 slidably supported at its other end upon a pin 284, carried by the printer frame (not shown). This link 283 is moved first to the right (Fig. 23) and then to the left for each rotation of the shafts 57 and 49. The left end of the link 283 cooperates with a pin 285 on a lever 286 pivoted on a rod 287.

This lever 286 is connected to and operated by the printing mechanism not shown or described in this case, but which is illustrated and described in the above mentioned Shipley application, Serial Number 687,305. Therefore, but a very brief description of this mechanism need be given here, it being thought sufficient to say that this lever 286 is moved clockwise under spring tension once during each rotation of the cam shaft 57 and restored to its home position by the link 283 as it is moved toward the left (Fig. 23). During the operations of a multiple item transaction, the lever 286 is not moved as far clockwise as it is during a single item transaction or during totalizing operations. These two movements of the lever 286, and especially the shorter movement is controlled directly by the item key 116.

The lever 286 carries a pin 288 which cooperates with a hook lever 289 loosely mounted upon a shaft 290 supported by the frame 60 and the printer frame (not shown). The lever 289 has a pin 291 which projects between arms 292 and 293, loosely mounted on the shaft 290. A spring 294 holds these arms 292 and 293 in contact with the pin 291. An arm 295 fastened to the shaft 290 has a pin 296 also extending between the arms 292 and 293.

Also pinned to the shaft 290 is an arm 300 (Fig. 32) having a straight slot 301 into which projects a pin 302 on a link 303.

The pin 302 also projects through a slot 304 in an arm 305 loose upon the shaft 290. The arm 305 has an integral arm 306.

The gear 72 (Fig. 17) has a race having two identical cam portions 307 spaced 180 degrees apart. Normally projecting into one of the cam portions 307 of the race is a roller 308 on a bell crank 309. This bell crank is connected by a pin and slot connection, to an arm 310 fast on a shaft 311 which has secured thereto an arm 312 (Fig. 30) connected by a link 313 to a bell crank 314 loosely mounted upon the shaft 290.

This bell crank 314 carries a double-ended pawl 315 normally held against a pin 316 by a spring 317.

The gear 72 as previously described makes only a half rotation for each operation of the shaft 57. During this half rotation the bell crank 309 is oscillated, first clockwise and then counter-clockwise to its normal position, and through the arm 310, shaft 311, arm 312, link 313, rocks the bell crank 314 first clockwise and then counter-clockwise.

The clockwise movement of the bell crank causes the pawl 315 to engage the arm 306 and rock the arm 305 (Fig. 32) clockwise, which, through the pin 302 rocks the arm 300, shaft 290 and arm 295 clockwise, and the pin 296, (Fig. 23) rocks the arm 293 clockwise, whereupon the spring 294 causes the arm 292 to rock the lever 289 thus removing it from the path of movement of the pin 288 on the lever 286.

With the lever 289 in the position to which it was moved, as just described, the clockwise movement of the lever 286 positions the pin 285 to the right of the lower end of the lever 132, and when the link 283 is moved to the left to the position shown, the pin 285 contacts the lower end of the restoring lever 132, and rocks it clockwise whereupon it would move the pin 131 and the detent 125 to the right (Fig. 23) and release the item key when it should not do so, at the end of rotation of the shaft 57 during a multiple item transaction.

Therefore, to prevent this release of the item key 116, at the end of the entry of any item of a multiple item transaction, the bar 135 (Fig. 30) has a pin 318, which, when the bar 135 is moved to the left by the depression of the item key 116, rocks the pawl 315 counter-clockwise thus moving it to such a position that when the bell crank 314 is rocked clockwise by the cam 307, the pawl 315 will not strike the arm 306, and consequently the arms 300 and 305 and the shaft 290 will not be moved. Therefore, the hook lever 289 (Fig. 23) remains in the position shown and when the lever 286 is rocked clockwise, the pin 288 strikes the hook end of the lever 289, thus permitting a short movement only, of the lever 286, and the pin 285 will not be moved to the right of the lower end of the restoring lever 132. Now, when the link 283 is moved to the left at each operation of the shafts 57 and 49, the restoring lever 132 and the detent 125 will not be moved and the item key 116 will remain depressed at the completion of each of the several operations of a multiple item transaction.

However, it is necessary that this key shall be released during the item total operation and the mechanism for doing so will now be described.

By means to be hereinafter described, the shaft 250 (Fig. 32) is given a slight clockwise movement when the total lever 120 is manually moved to the item total position after which said shaft is given additional movement during the item total taking operation.

Secured to this shaft 250 is an arm 325, (Fig. 32) to which is pivoted a link 326, carrying a roller 327 projecting into a slot 328 (see also Fig. 33), in a frame 329, which slot and roller act as a guide for the movement of the link 326. The link 326 also carries a roller 330, normally contacting the underside of an arm 331, secured to the shaft 290.

The first, or manual, movement of the shaft 250 rocks the arm 325, which through the link 326 and arm 331, rocks the shaft 290 clockwise. This movement of the shaft 290, does not move the lever 289 (Fig. 23) out of the path of movement of the pin 288 and therefore, during the first cycle of movement of the item total operation, the lever 286 receives a short movement, and the item key 116 is not released.

Near the end of the first cycle of shaft 57, the shaft 250, the arm 331 and shaft 290 are given additional clockwise movement, which moves the lever 289 out of the path of movement of the pin 288 and consequently, as the link 283 is moved to the right (Fig. 23) the pin 285 on the lever 286 follows the link 283 thus moving the pin to the right of the lower end of the restoring lever 132. Now, when the link 283 is moved to the left the restoring lever 132 moves the detent 125 to the right, thus releasing the depressed item key 116.

*Machine release during total and sub-total operations*

During total and sub-total operations, since only one totalizer can be cleared during any one operation, it is necessary that any one of the keys 118, or any one of the keys 119 in conjunction with the motor bar 80, release the machine for operation.

To accomplish the above result there is a device, which couples together the clerks' and transaction controlling bars 201 and 205 (Figs. 10, 11 and 12) so that both projections 218 and 219 may be withdrawn from the path of the pin 216 for such operations.

The bar 205 (Figs. 11 and 12) has a slot 335 adapted to receive the upper end of a coupling lever 336 pivoted at 337 on the bar 201. The lever 336 has a fork 338 engaging a pin 339 on an arm 340, secured to the arm 268.

To reset the transaction totalizers, the total lever 120 is moved to the "reset trans. total" position; and to reset the clerks' totalizers it is moved to the "reset clerk's total" position. To take a reading or sub-total operation of the transaction totalizer the lever 120 is moved to the "read trans. total" position; and to take a sub-total of the clerks' totals it is moved to the "read clerk's total" position.

When the lever 120 is moved to the "item total" position the arms 268 and 340 are not moved because the portion 263 (Figs. 12 and 28) of the slot in the cam plate 261 is concentric with the pivot of the total lever. When the total lever is moved to the "reset trans. total" position the roller 267 is moved into the cam portion 262 thus rocking the arms 268 and 340 clockwise which moves the coupling lever 336 into the notch 335. As it is necessary to move the total lever farther than is required to rock the coupling lever 336, the right hand side of the fork 338 is shorter than the left hand side and the pin 339 is disengaged from the lever 336 after the coupling of the controlling bars 201 and 205 has been effected and the upper end of the coupling lever is held in the notch 335 by a spring 341. When the lever 120 is moved to the "reset clerk's total" position then the roller 267 is moved into the extreme right hand portion of the cam slot 262, but since the pin 339 is disengaged from the fork 338 the coupling lever 336 receives no further movement than it did when the total lever was moved to the "reset trans. total" position.

When the total lever is moved to the "read trans. total" position the coupling lever 336 is moved into the notch 335 of the detent 205 by the cam slot 264. When the total lever is moved to the "read clerk's total" position, the cam slot 265 causes the lever 336 to enter the notch.

Whenever the coupling lever 336 is in notch 335, the depression of a key 118 or 119, to control the selection of a totalizer for a total or sub-total operation, withdraws both of the projections 218 and 219 from the pin 216 and also withdraws the arms 223 and 228 from the pin 217 thus permitting the motor bar 80 to release the machine for a total or sub-total operation, as the case may be.

*Clerk and transaction key interlock*

When the total lever is moved into either of the transaction total positions, it is essential that a transaction key 119 only, be depressed and that the clerks' keys 118 be prevented from being depressed, and when the total lever 120 is moved into either of the clerks' total positions, it is essential that a clerk's key 118 only be depressed and that the transaction keys 119 be prevented from depression.

To accomplish the above result, the mechanism is arranged as follows. The arm 268 (Fig. 13) has a pin 346 engaged by a slot in an interlocking arm 347 provided with notches 348 and 349. This arm 347 is loosely mounted upon the shaft 250. The transaction detent supporting arm 184 (Fig. 13) has a lug 350 and the clerks' detent supporting arm 174 (Fig. 14) has a lug 351. It will be recalled that the depression of a clerk's key 118 and transaction key 119 moves the key 118 and transaction key 119 downwardly retaining detents 172 and 182 downwardly until the key pins 171 and 181 pass the shoulders 178 and 188, whereupon the springs 177 and 187 raise the detents to lock the operated keys in depressed positions. The downward movement of the detent 182 rocks the arm 184 clockwise, and during item-entering operations the lug 350 passes in front of the interlocking arm 347. When the total lever is moved to take a total or sub-total of a transaction totalizer, the arm 268 positions the interlocking arm 347 so that the notch 348 is in the path of movement of lug 350 associated with the transaction keys 119 and when a transaction key 119 is depressed the notch 348 provides a space into which the lug 350 may move. Should an attempt now be made to depress a clerk's key, the lug 351 associated therewith would contact the outer periphery of the interlocking arm 347 thus preventing depression of said clerk's key.

When the total lever 120 is moved to either of the clerks' total positions, the interlocking arm 347 is moved to position the notch 349 (Fig. 13) in the path of the lug 351 (Fig. 14) to provide a space for said lug upon depression of the clerk's key 118. Should an attempt now be made to depress a transactiton key 119, the lug 350 would contact the outer periphery of the interlocking arm 347 thus preventing depression of said key.

As above mentioned, the clerk's keys 118, and the transaction keys 119 are "stay-down" keys, and therefore, at the end of a total-taking operation the depressed key 118 or 119 remains depressed. With either of these two keys depressed, and with the total lever 120 in a total-taking position, the machine is free to be released by depressing the motor bar 80, as above described. Let us assume now that the operator has reset a clerk's totalizer during the previous operation of the machine, and at the end thereof the selected clerk's key 118 remains depressed. Then let us assume that the operator desires to reset a "transaction" totalizer. First the operator shifts the total lever 130 into the "transaction reset" position, and since the previously depressed "clerk" key is still depressed, the machine could be released for operation with the total lever in the "transaction" position, and the "clerk" key 118 depressed. This would result in the machine selecting the "transaction" line of totalizers and selecting a totalizer from the "clerk" line of totalizers. This would result in improper operation of the machine.

To prevent such a result an interlock is provided to prevent shifting of the total lever 130 while a key 118 or 119 is depressed. This interlock includes the arms 203 and 207 (Figs. 8 and 11), each of which is provided with a locking finger 342. When the total lever 120 is moved into the "read trans. total" or "reset trans. total" position (Fig. 1), a notch 343 in a plate 344 secured to the arm 268, is positioned directly beneath the locking finger 342. Then when either one of the arms 203 or 207 is moved by depression of either one of the keys 118 or 119, for a total or sub-total operation, the finger 342 associated with the depressed key enters the notch 343, thus preventing any movement of the total lever as long as the key remains depressed.

Before the total lever 120 can be moved from either the "reset transaction" or "read transaction" position into either the "reset clerk" or "read clerk" position, it is necessary to release the depressed transaction key 119 by operation of the lever 193 as above described. This operation of the lever 193 is to withdraw the finger 342 from the notch 343, since the lever 120 cannot be shifted when the plate 268 is locked by the finger 342, inasmuch as the stud 267 projects into the cam slot in the plate 261. Release of such key 119 by means of the lever 193 withdraws the locking finger 342 from the notch 343 and permits adjustment of the total lever 120. Then when the total lever is moved into either the "clerk's read" or "clerk's reset" position, the notch 345 is positioned in the path of the locking finger 342. Subsequent depression of a clerk's key 118 enters the finger 342 associated therewith into the notch 345, to hold the total lever in such position until the clerk's key 118 is released by operation of the lever 193 as above mentioned.

A similar notch 352 is provided in the plate 344, adapted to be positioned in the path of the locking finger 342, when the total lever is in the "add" position, and depression of the keys 118 and 119 shifts both locking fingers 342 into said notch 352 to prevent moving the lever 120 into a "transaction" read or reset position; or into a "clerk" read or reset position. However, the concentric section 362 of the cam slot in the plate 361 permits the lever 120 to be shifted out of the "add" position and into the "item total" position, thus permitting the taking of a total of a multiple-item transaction without releasing the keys 118 and 119.

Differential mechanism

There are two types of differential mechanisms used in this machine. Those associated with the amount keys 117 and the transaction keys 119 are of one type; and that associated with the clerks' keys 118 is of another type. The amount differential mechanism is used for the purpose of accumulating on the various totalizers under the control of the amount keys and also used as a means for clearing the totalizers. It is also used to set indicators and printers in a manner fully illustrated and described in the above mentioned Shipley application.

The transaction differential mechanism is used to select the totalizers on the back totalizer line for operation, and to select the transaction indicators and set up the printer to designate which of the transaction keys has been depressed. The clerks' differential mechanism is used to select the clerks' totalizers on the front totalizer line, and also to select the clerks' indicators and control the type wheel to print a character representing the clerk's key which has been depressed.

*Differential mechanism—amount*

There is a differential unit for each of the amount banks of keys, and also two extra units of higher denominations than said keys which may be operated only when a transfer to them is necessary.

The amount differential mechanism used in this machine is substantially the same as that illustrated and described in the above mentioned Shipley, Fuller and Chryst patents.

Each amount differential unit is supported by hangers 360 (Fig. 5) mounted on the rod 269 and a rod 361. A rod 362 extends through all of the units and acts as a stabilizer for them. Each unit is driven by a pair of cams 363 and 364 fastened to the shaft 57. Each pair of cams 363—364 cooperates with rollers 365 and 366 on a Y-shaped lever 367 pivoted at 368 on the hanger 360.

Pivoted to the lever 367 is a link 369 pivoted to a driving segment 370 loosely mounted on a hub 371 which separates the hangers 360. Clockwise movement of the cams 363 and 364 rocks the segment 370 first clockwise and then counter-clockwise to normal position.

Associated with each denominational order of the totalizers are three differentially movable segments or actuators 372, one associated with each of the three totalizer lines, mounted between two nearly circular plates 373, which in turn are pivoted upon the hub 371. The segments 372 and plates 373 are connected to the driving segment 370 by a latch 374 carried by an arm 375 and a bell crank 376 pivoted on the plates 373. The latch 374 is held in engagement with a shoulder on the segment 370 by a spring 377.

By this connection the actuators 372 are rotated clockwise (Fig. 5) until the forward end of the bell crank 376 strikes the end of a depressed amount key 117. When this occurs the arm 375 and bell crank 376 are rocked counter-clockwise, thus disengaging the latch 374 from the segment 370. The differential actuators 372 stop moving, but the segment 370 continues until it reaches the end of its clockwise movement.

When the latch is thus disengaged, the foot thereof rides upon the outer periphery of the segment 370 and the front end of the latch 374 enters a notch 378, opposite the key depressed, in an arc-shaped plate 379 supported by the rod 269 and the upper end of the hanger 360, thus locking the differential actuators 372 in their adjusted positions. There are ten notches 378, one for each of the nine keys, and one at the zero position.

An arm 380 attached to the usual "reset spider" (not shown) has a slot 381 into which projects a pin 382 on the bell crank 376. This arm 380 is in line with the zero stop pawl 160. Therefore, when no key is depressed and the plates 373 and actuators 372 are rocked clockwise, the arm 380 contacts with the pawl 160 and causes the latch 374 to be disengaged from the driving segment 370, thus stopping the actuators 372 in the zero position.

When the segment 370 is rocked counter-clockwise (Fig. 5) a shoulder 383 thereon contacts a pin 384 when the segment 370 reaches the position in which the latch 374 was disengaged therefrom, and restores the plates 373 and actuators 372 to normal position. The time when the segment 370 engages the pin 384 varies according to the key which has been depressed. If the "2" key has been depressed the segment 370 does not engage the pin 384 until near the end of its counter-clockwise movement. However, if the "9" key has been depressed and the latch disengaged in the "9" position, the pin 384 is engaged immediately upon the return movement of the segment 370, thereby causing a greater rotation of the actuators 372 and consequently of the totalizer previously engaged therewith.

As will appear later, the totalizers are rocked into engagement with the actuators 372, during adding operations, after the latches 374 have been disengaged from the driving segments 370, so that as the actuators 372 are returned to normal positions, the amount, as determined by the keys depressed, is accumulated on the totalizer.

*Differential mechanism—transfer*

The carrying mechanism in this case is identical with the carrying mechanism illustrated and described in the above mentioned Shipley Patent No. 1,619,796 and Chryst Patent No. 1,230,864. It has been only partially illustrated, and therefore will be but very briefly described here.

Associated with each of the actuators 372 is a two-toothed carrying arm 390 (Fig. 5) pivoted on the plates 373. Considering now the actuator 372 and carrying arm 390 associated with the upper totalizer line, when the actuator 372 is rocked clockwise it closes the gap between itself and its associated arm 390, thus permitting such arm to be positively coupled to the actuator 372 by a lever 391. As the actuator 372 is moved counter-clockwise, if no transfer is to take place, the carrying arm 390 is stopped in the position shown in Fig. 5. If a transfer takes place, this carrying arm moves one step farther in a counter-clockwise direction before it is stopped, thus causing "one" to be added to the totalizer pinion.

Differential mechanism—beam

Associated with the differential mechanism is a beam 393 (Fig. 5) pivoted at 394 to the plates 373. The beam is slotted to receive a stud 395 on a link 396 connected to an indicator segment 397. There is one indicator segment for each of the amount banks and one for each of the two overflow banks. These segments are mounted on nested sleeves 398 and a shaft 399. The link 396 is also connected to an arm 400. There is one arm 400 for each amount bank and one for each overflow bank. These arms are mounted on nested sleeves 401 supported on a shaft 402. The sleeves 398 are connected with the indicator setting mechanism, and the sleeves 401 are connected with the type wheel setting mechanism.

The differential movement of the plates 373 positions the left end of the beam 393 accordingly, after which a roller 403 on the lever 367 contacts the underside of the beam 393 and moves the beam until its upper edge engages a hub on the plate 373, thereby positioning the right end of the beam and consequently the link 396, segment 397 and arm 400, which sets the amount indicator and the amount type wheel according to the value of the key depressed.

Differential mechanism—divided bank transaction keys

The transaction differential mechanism is similar to the amount differentials, except that the actuators 372 and plates 373 are omitted, and replaced by the previously mentioned differential arm 406 (Figs. 6, 10 and 28) supported on the rod 266. This transaction differential mechanism is supported by hanger 408 (Fig. 6) mounted upon the rods 269 and 361.

The arm 406 (Fig. 10) carries a latch 374, an arm 375 and a bell crank 376, identical with those used in connection with the amount banks. The differential arm 406 carries the pin 409 which cooperates with the lever 255 (Figs. 28 and 29) in a manner previously described. The latch 374 is held in engagement with the transaction differential driving segment 370 by a spring 377. The segment 370 has a shoulder 383 which cooperates with a pin 384 on the arm 406 in the same manner that the shoulder 383 on the amount differential driving segment 370 (Fig. 5), cooperates with the pin 384 on the amount differential actuator carrying plates 373.

This transaction differential driving segment 370 receives its movement from a link 369 pivoted to a Y-shaped lever 367 oscillated by a pair of cams 363 and 364 on the main cam shaft 57.

There is no zero stop pawl for this divided bank of keys 118 and 119. Consequently, the arm 406 never stops in the zero position. During adding operations it stops in a position corresponding to the transaction key depressed, and during totalizing operations, when transaction totalizers are being cleared, said transaction arm 406 also stops in a position corresponding to the transaction key depressed. But during totalizing operations, when clerks' totalizers are being cleared, this transaction arm 406 stops in a position corresponding to the clerk's key depressed. However, this does not affect the operation, since during the latter totalizing operations, the total lever 120 has been moved to the "reset clerk's total" position, and consequently nothing but clerks' totalizers can be selected. The reason the transaction arm 406 stops in the various clerks' positions, during the clearing operations for the clerks' totalizers, is because both clerks' and transactions keys are in the same plane and since no transaction key is depressed, the transaction differential arm will move upwardly until the transaction differential latch strikes the lowest clerk's key depressed.

Pivoted at 394 to the arm 406 (Fig. 10) is the usual beam 393 engaging a stud 410 on a link 411, pivoted to an indicator segment 412 fastened to a sleeve 413 mounted on the shaft 399. The link 411 is also pivoted to a type wheel setting and totalizing shifting arm 414, connected to the transaction type wheel and the transaction totalizer shifting mechanism to be hereinafter described.

The lever 367 has a roller 403 which cooperates with the beam 393 in the same manner that the roller 403 (Fig. 5) cooperates with the beam 393 for the amount banks.

Differential mechanism—divided bank clerks' keys

Associated with the clerks' keys 118 is a differentially movable lever 420 (Fig. 8) having a latch 421 normally engaged by a latch retaining arm 422 loosely mounted on the shaft 64. A torsion spring 423 holds the arm 422 in engagement with the latch 421. The lever 420 has four projections 424, 425, 426 and 427, which cooperate with the clerks' keys A, B, D and E (Fig. 1), respectively.

When a clerk's key 118 (Fig. 8) is depressed, its pin 200 determines how far the lever 420, shall be moved counter-clockwise by a spring 428 when said lever 420 is released.

To release the lever 420, the shaft 64 has secured thereto a latch releasing arm 429, which, when the shaft 64 is rocked to release the machine, strikes a pin 430 on the latch retaining arm 422 and disengages this arm 422 from the latch 421, whereupon the spring 428 rocks the lever 420 counter-clockwise until one of the lugs 425, 426 or 427 strikes the pin 200 on one of the keys B, D or E, which has been depressed. When the A key is depressed, its pin 200 immediately engages the lug 424 and therefore, there is no movement of the lever 420.

To restore the lever 420 to its normal position, it carries a roller 431 adapted to be struck by a shoulder 432 on the previously described arm 215 fast on the machine releasing shaft 64. When the shaft 64 is rocked counter-clockwise (Fig. 8), beyond its normal position as previously mentioned, to release the amount keys the shoulder 432 strikes the roller 431, thereby rocking the lever 420 clockwise to normal position.

During totalizing operations, when none of the keys 118 is depressed, the latch retaining arm 422 is released from the latch 421 in the same manner as it is during adding operations and the lever 420 is moved counter-clockwise until a shoulder 433 contacts a stud 434.

Figure 7:
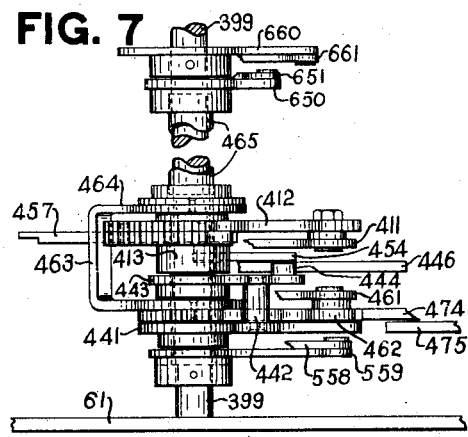
Fig. 7 is a plan view showing the connections from the differential mechanism, associated with the upper group of keys, to the indicator, printer and totalizer selecting means.

The lever 420 is connected to a stud 440 on an indicator controlling arm 441 (Figs. 7 and 8) pivoted on the sleeve 413. The arm 441 is connected by a stud 442 and the stud 440 to a second indicator controlling arm 443 also pivoted on the sleeve 413. The arm 443 has a pin 444, the purpose of which will be hereinafter described.

The movement of lever 420 is imparted to the indicator controlling arms 441 and 443 which sets the pin 444 in a position corresponding to the depressed key 118.

After the pin 444 has been set under control of the keys 118, an aligning device to be later described, is operated to enter one of the notches 445 of the indicator controlling arm 441, thereby holding both arms 441 and 443, and the pin 444 in the positions in which they have been set.

Cooperating with the pin 444 is an indicator segment adjusting lever 446 pivoted at 447 to an arm 448, loosely mounted upon the rod 266. The lever 446 has two cam surfaces 449 and 450 converging into a notch 451. The lever 446 also has a slot 452 into which projects a roller 453 on a lever 454 pivoted on a shaft 455. The lever 454 also engages a roller 456 on an arm 457 pivoted upon the sleeve 413. This arm 457 has a slot 458 engaging a stud on the previously described lever 367.

When the lever 367 (Fig. 8) is rocked clockwise the arm 457 is rocked counter-clockwise, which, through the roller 456 rocks the lever 454 clockwise whereby the indicator segment adjusting lever 446 is rocked counter-clockwise about its pivot 447 until one of the cam surfaces 449 or 450 engages the pin 444. If the pin is setting in such a position that the surface 450 engages it, then the lever 446, as it is being rocked counter-clockwise, is also lowered until the pin 444 finally rests within the notch 451. If the lever 446 from a previous operation of the machine has been left in a lower position than that shown in Fig. 8, then the cam surface 449 strikes the pin 44, as the lever 446 is being moved counter-clockwise, and the lever 446 is raised until the pin 444 enters the notch 451.

Figure 8:
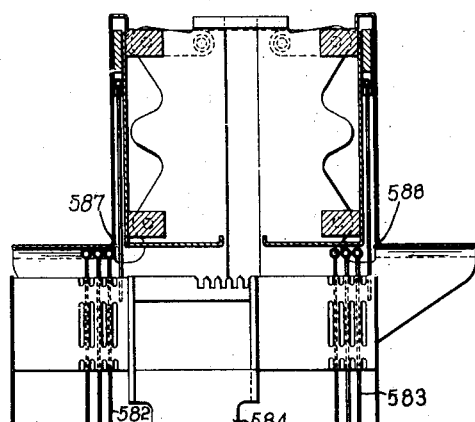
Fig. 8 is a section taken alongside the divided bank, with the differential mechanism for the lower group of keys omitted.
Figures 9, 10:
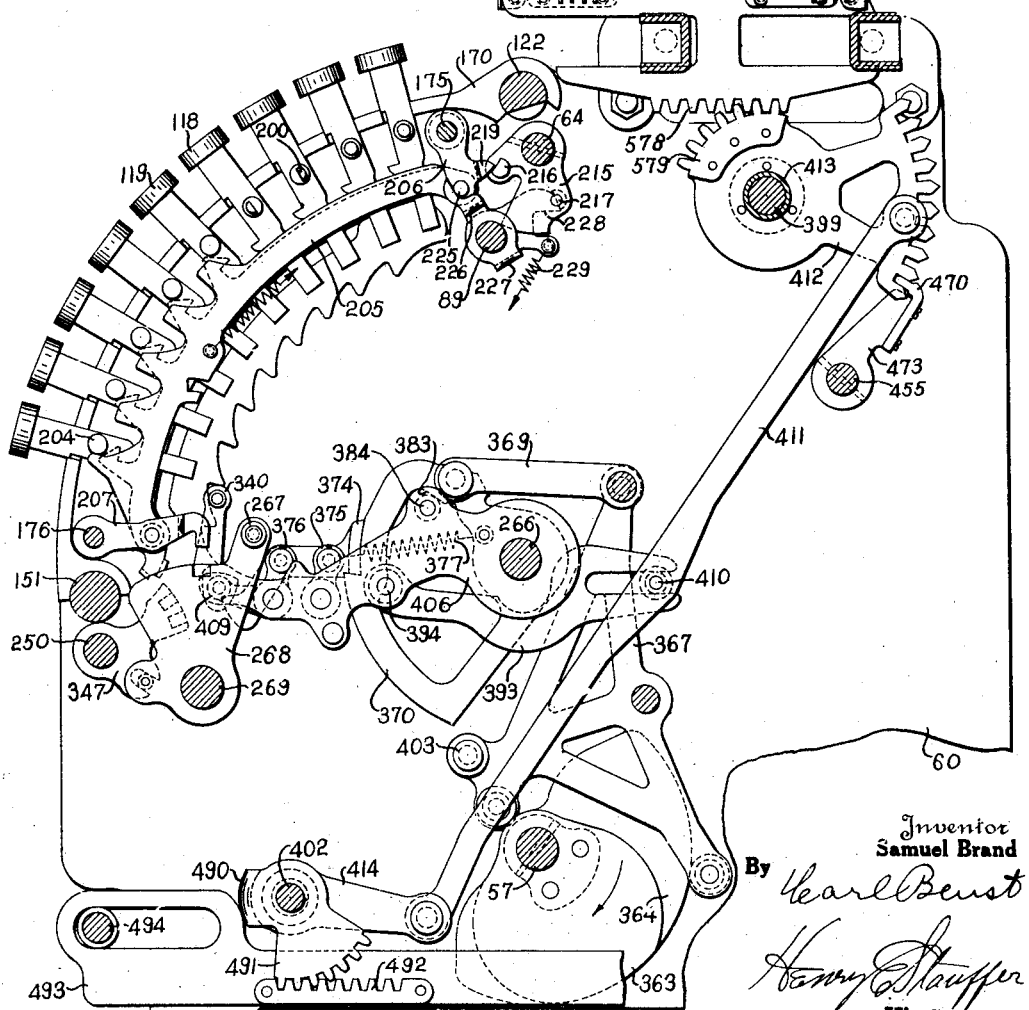
Fig. 9 is a front view of a portion of the machine release mechanism associated with the divided bank.
Fig. 10 is a section taken alongside the divided bank, with the differential mechanism for the upper group of keys omitted.

If, with the parts in the positions shown in Fig. 8 the top key 118 is depressed, the lever 420 does not move and consequently the pin 444 will not be moved. Therefore, as the lever 454 rocks the indicator segment adjusting lever 446 counter-clockwise, neither of the surfaces 449 or 450 strikes the pin 444, and the lever 446 continues to rock until the notch 451 directly engages the pin 444.

When the lever 446 is moved either up or down, as just described, the arm 448 is positioned likewise. This arm 448 engages a pin 460 on a link 461 connected to an indicator segment 462 connected by a yoke 463 to an arm 464 secured to a sleeve 465 (Figs. 7 and 24) which goes to the special counter selecting mechanism to be hereinafter described. The link 461 is also pivoted to an arm 466 secured to the shaft 402, to set up the clerks' type wheel and position the front totalizer line to select the clerk's totalizer corresponding to the key which has been depressed.

The indicator segment 462 has notches 467 one of which is normally engaged by an aligning device which is disengaged therefrom at the proper time as will be later described.

From the above description it will be clear that, the adjustment of the indicator segment adjusting lever 446, as determined by the position of the pin 444, will be imparted by the arm 448 and link 461 to the indicator segment 462 and sleeve 465 to select the indicator and the special counter, and through the link 461 the shaft 402 will be moved to select the proper clerks' type and clerks' totalizer.

Differential mechanism—aligners

Cooperating with the segments 397 (Fig. 5), which are set by the amount differential mechanism, and with the indicator segments 412 (Fig. 10), set by the transaction differential mechanism is an aligner bar 470 supported by a pair of arms 471 and 473 secured to the shaft 455. Also secured to the shaft 455 is an aligner arm 474 (Fig. 8), which cooperates with the indicator segment 462, differentially set by the adjusting lever 446 under control of the lever 420, controlling arms 441 and 443 and pin 444. Both of these aligners 470 and 474 are normally engaged with their respectve indicator segments.

At the proper time, said aligners are all disengaged from the indicator segments and said segments 397, 412 and 462 are set differentially under the control of the amount, transaction and clerks' keys. The mechanism for rocking the shaft 455 is substantially the same as that illustrated and described in the above mentioned Shipley and Fuller patents and therefore will not be described here.

Cooperating with the indicator controlling arm 441 is an aligner 475 (Figs. 6, 7 and 8) connected by a yoke 476 to an arm 477 (Fig. 17) pivoted to a link 478, which is connected to the bell crank 309 operated by the cams 307. After the indicator controlling arm 441 has been differentially set by the lever 420, the aligner 475 is rocked counter-clockwise (Figs. 8 and 17) to enter the notch 445 opposite it at that time, thus locking the indicator controlling arm 441 and the pin 444, so that the pin 444 may position the indicator segment adjusting lever 446 to control the setting of the clerks' indicators, the selection of the special counters, the setting of the clerks' type wheel and the selection of the proper clerks' totalizer, depending upon which of the clerks' keys 118 has been depressed.

Totalizers

The machine illustrated in this application has nine totalizers. There are four clerks' totalizers on the front totalizer line; four transaction totalizers on the rear totalizer line; and a single item totalizer on the upper totalizer line.

These totalizers are of the same general type as those illustrated in the Chryst, Fuller and Shipley patents above mentioned. For this reason only a brief description of them will be necessary here. Each totalizer includes a plurality of pinions 480 (Fig. 5) loosely mounted upon a tube 481, carried by a pair of arms 482 (Fig. 6) (only one of which is shown for each tube) slidably mounted upon a rod 483. Each arm 482 has a fork 484 engaging a lug 485 on the hanger 408 to prevent oscillation of the arm 482.

The arms 482, tube 481 and shaft 483 form a movable totalizer frame.

The upper totalizer frame is movable only for the purpose of engaging and disengaging the item totalizer with the actuators 372. The front and back totalizer frames are movable laterally for the purpose of selecting a transaction and clerk's totalizer, respectively, as well as being movable toward and from the actuators 372.

Totalizers—selecting mechanism

There is no totalizer shifting mechanism for the item totalizer because it is always in position to engage the actuators 372 whenever the item key 116 is depressed.

The totalizer frames with their totalizers, on the front and back totalizer lines, are selected and shifted by their respective differential mechanisms under the control of the keys 118 and 119. The front totalizers are shifted under control of the clerks' keys 118 and the rear totalizers are shifted under control of the transaction keys 119.

Figure 2:
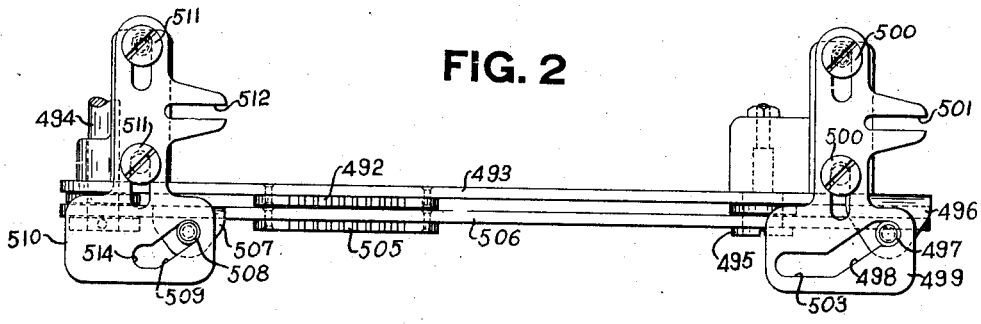
Fig. 2 is a plan view of the shifting mechanism for the front and back totalizer lines.
Figure 6:
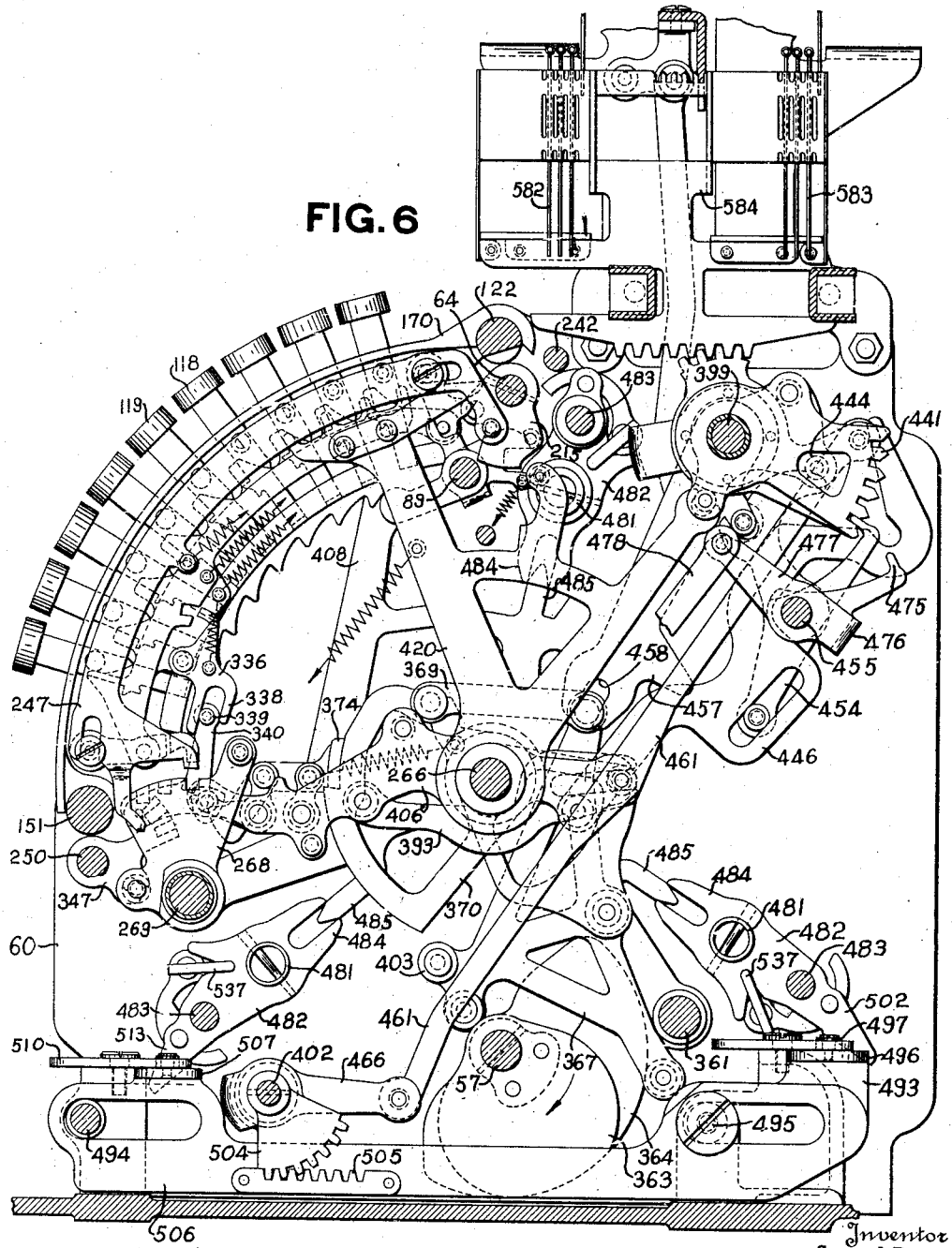
Fig. 6 is a section taken alongside the divided bank, showing the differential mechanisms associated therewith.

It will be remembered that the arm 414 (Fig. 10) is set differentially under the control of the transaction keys 119. Secured to the arm 414 by a yoke 490 is a segment 491 meshing with a rack 492 secured to a slide 493 (Figs. 2 and 10) mounted upon a shaft 494 and a screw stud 495 (Fig. 6). The slide 493 has a lug 496 (Figs. 2 and 6) carrying a roller 497 entering a cam slot 498 in a totalizer frame shifting plate 499, slidably mounted upon two screw studs 500 in a lug on the machine base. This plate 499 has a slot 501 into which projects an extension 502 of the arm 482 of the rear totalizer frame.

The differential positioning of the arm 414 through the segment 491 and rack 492, moves the slide 493 whereby the roller 497 is moved into various positions of the angular portion of the cam slot 498, depending upon which key 119 has been depressed. This slides the totalizer frame shifting plate 499, and through its connection with the arm 482 shifts the rear totalizer frame to select a totalizer corresponding to the key depressed. When a total is being taken from a clerk's totalizer and none of the transaction keys 119 is depressed, the roller 497 moves into a portion 503 of the slot 498 as the transaction differential moves to its several idle positions as previously pointed out.

The arm 466 (Figs. 6 and 8) which is differentially set under control of the clerks' keys 118, is fastened to the shaft 402 as previously stated. Also secured to this shaft is a segment 504 meshing with a rack 505 secured to a slide 506 mounted upon the shaft 494 and stud 495. This slide 506 has a lug 507 (Fig. 2) having a roller 508 entering a cam slot 509 in a totalizer frame shifting plate 510 guided by screw studs 511 in a lug on the machine base. The plate 510 has a slot 512 entered by an extension 513 (Fig. 6) on the arm 482 of the clerks' totalizer frame.

The differential setting of the arm 466, through the segment 504, rack 505 and slide 506 causes the totalizer frame shifting plate 510 to be slid to select a clerk's totalizer corresponding to the key depressed. The slot 509 (Fig. 2) has a portion 514 into which the roller 508 is moved when none of the clerks' keys 118 is depressed during a totalizing operation wherein one of the transaction totalizers is being cleared.

Totalizers—engaging controlling mechanism

The mechanism for rocking the totalizer line to engage the totalizers with the actuators 372 is as follows:

Near each end of each shaft 483 is an arm 520 (Fig. 16) carrying a roller 521 entering a cam slot 522 in plates 523 fixed to the frames 60 and 61. Pivoted to one arm 520 on each shaft 483 is a link 524 carrying a pin 525 adapted to be moved into engagement with a hook 526 on a totalizer engaging and disengaging spider 527 pivoted on the rod 266. There are three hooks 626, one for each of the links 524.

Figure 16:
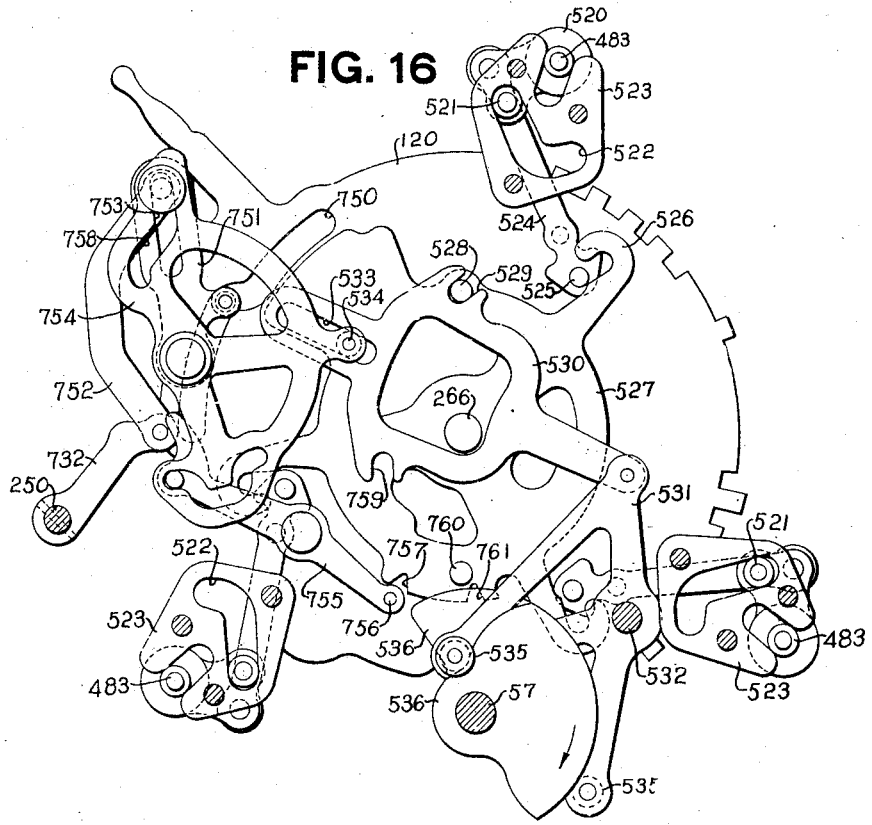
Fig. 16 shows the totalizer engaging mechanism and the controlling means therefor.

The spider 527 has a pin 528 normally engaged by a notch 529 in a link 530, one end of which is pivoted to a lever 531 mounted on a stud 532 on the machine frame. The other end of the link 530 has a slot 533 engaging a pin 534 to guide the link 530 in its movements. The lever 531 has two rollers 535 coöperating with a double plate cam 536 secured to the shaft 57. Clockwise movement of the cam 536, through the lever 531 and link 530, rocks the totalizer engaging and disengaging spider 527 first clockwise and then counter-clockwise (Fig. 16).

If, during the movement of the spider 527 any of the pins 525 are in engagement with the hooks 526, the links 524 will rock the arms 520 counter-clockwise thus causing the rollers 521 to follow the cam slots 522, which draws the shafts 483 toward the rod 266, thus causing the selected totalizers associated with these shafts 483 to be engaged with the actuators 372. The totalizers are held in engagement with the actuators until after said actuators have been restored to normal positions, during which time the amounts, according to the values of the keys depressed, are entered into the totalizers. The counter-clockwise movement of the spider 527 to normal position restores the shafts 483 to normal positions thus disengaging the totalizers from the actuators 372.

While the totalizers are being engaged with the actuators, an aligner bar 537 (Fig. 6) is withdrawn from the pinions 480 to allow the selected ones to be rotated. When the selected pinions 480 are in engagement with the actuators 372, the remaining pinions engage the lugs 485 on the hangers 360 and 408 and are thus prevented from being turned. When the totalizers are disengaged from the actuators 372, the bar 537 is again engaged with all of the pinions 480. For a full illustration and description of the mechanism for operating this bar 537 see the above mentioned Fuller Patent 1,242,170 and the Shipley Patent No. 1,619,796.

The totalizer line selecting mechanism provides means for preventing or permitting, as desired, either the clerks' or transaction totalizer lines, or both, to be rocked to engage the totalizers with the differential mechanism simultaneously.

The upper totalizer line is rocked to engage its totalizer with the differential actuator whenever the item key 116 is depressed, but is not engaged with the differential mechanism during a single item transaction. The clerks' and transaction totalizer lines only, are controlled by the totalizer engaging controlling mechanism. After a particular one or both of these totalizer lines have been shifted to select a totalizer thereon to be operated by the differential actuators 372, the selected pinions 480 are rocked into engagement with said actuators in the manner above described.

Loosely mounted on a hub 540 on the rod 266 is a three-armed lever 541 (Fig. 19) each arm of which engages a lever 542 pivoted on a stud 543. Pivoted to each lever 542 at 544 is a lever 545 having a slot into which projects a pin 546 on the link 524. Pivoted to the lever 542 for the back totalizer line is a link 547 carrying a pin 548 engaged by a hook 549 of an arm 550 pivoted on a stud 551. The arm 550 has a roller 552 engaging a cam 553 secured to the shaft 57.

During the clockwise rotation of the cam 553 the lower lever 542 (Fig. 19) is rocked clockwise, which, through the lever 541 rocks the other two levers 542 clockwise. This movement of the levers 542 rocks each of the levers 545 counter-clockwise with the pin 546 as the fulcrum point until pins 554 on the levers 545 strike the outer edges of slots 555 (Fig. 18) in the total lever 120, whereupon the levers 545 rock counter-clockwise with the pins 554 as the fulcrum. This last movement of the levers 545 rocks the links 524 clockwise and disengages the pins 525 from the hooks 526 of the totalizer engaging and disengaging spider 527 (Fig. 16), if said pins were engaged with the hoops 526 during the previous operation.

Each pin 554 projects in the plane of a totalizer selecting disk 556 loose upon the hub 540. Springs 557 tend to hold the pins 554 against the disk 556. The disk 556 has pivoted thereto a link 558, also pivoted to an arm 559, secured to the previously described sleeve 413.

This disk 556 is shown in the zero position in Fig. 19, a position which it can never assume again after being operated once, because there is no zero stop pawl for the divided bank of keys.

This sleeve 413 as previously stated is also secured to the transaction indicator segment 412. Therefore the disk 556 is differentially positioned under control of the transaction keys 119.

When the arm 550 is rocked clockwise to normal position, the lever 542 associated with the back totalizer line, is rocked counter-clockwise to normal, which, through the lever 541 tends to rock the levers 545 clockwise with the pins 546 as the pivot points. If the disk 556 has been positioned so that high spots 559 thereon are opposite the clerks' and transaction pins 554, these pins will contact the disk, and change the fulcrums for the levers 545 from the pins 546 to the pins 554 when the levers are rocked clockwise. This clockwise movement of the levers 545 with the pins 554 as the pivot points rocks the links 524 and moves the pins 525 into the hooks 526, and when the totalizer engaging and disengaging spider 527 is rocked the totalizer lines will be moved towards the differential mechanism to engage the selected totalizers with the actuators.

The high spots 559 on this disk 556 are opposite the "cash, charge, received-on-account and paid-out" positions for that portion of the disk associated with the transaction totalizer line, and the high spots 559 on that portion of the disk 556 which is associated with the clerks' totalizers are opposite the cash and charge positions only.

Therefore whenever the cash and charge keys are depressed those totalizers will be selected, and whichever of the clerks' totalizers has been selected for this operation will also be engaged with the actuators, because of the high spots 559 opposite the cash and charge positions for the clerks' side of the totalizer selecting disk 556. However, when either the received-on-account or paid-out key 119 is depressed, the clerks' totalizer line will not be rocked towards the actuators because there are low spots on the disk 556 opposite the received-on-account and paid-out positions on the clerks' side of this disk. There are high spots in these two positions on the transaction side, and therefore, the transaction totalizer line will be rocked to engage the selected totalizer with the actuators.

As previously stated, this totalizer line selecting mechanism applies only to the clerks' and transaction totalizer lines. The manner of determining when the upper totalizer line shall be rocked into engagement with the differential mechanism will now be described.

Whenever a multiple item transaction is entered in the machine, the upper totalizer line which contains only the item totalizer, is engaged with the actuators 372. This is controlled by the depression of the item key 116.

The bar 135 (Fig. 19) has connected thereto the link 240 which in turn is connected to an arm 241 fast upon the shaft 242. This shaft 242 also has secured thereto an arm 565 (Figs. 19 and 20) connected by a torsion spring 566 to an arm 567 loosely mounted upon the shaft 242. The arm 565 has a pin 568 normally engaged by a toe 569 on the arm 567. Pivoted to the arm 567 is a link 570, also pivoted to an arm 571 loosely mounted upon the hub 540. The outer end of the arm 571 has a radius equal to the radius of the high spots 559 on the totalizer selecting disk 556.

When the item key 116 is depressed it moves the bar 135 to the left (Fig. 19), which, through the link 240 and arm 241 rocks the shaft 242 and arm 565 clockwise. The spring 566 then moves the arm 567 clockwise, which lowers the link 570 until the arm 571 strikes the pin 554 of the link 545. Then after the link 545 is moved by the lever 542, as previously described, the spring 566 moves the arm 571 in front of the pin 554 so that when the link 545 is rocked clockwise with the pin 546 as a pivot point, the pin 554 will strike the arm 571, and change the fulcrum point of the lever 545 from the pin 546 to the pin 554, thus causing the lever 545 to rock clockwise about the pivot 554, which rocks the link 524 counter-clockwise and moves the pin 525 into the hook 526 of the totalizer engaging and disengaging spider 527.

Since the item key 116 is not released at the end of each operation of a multiple item transaction the arm 571 will maintain this position until the item total is taken, at which time the item key is released, thus permitting the parts 571, 570, 567, 565, 241, 240 and 135 to return to their normal positions under the influence of the spring 134 (Fig. 30).

*Indicators*

The indicators used in this machine are of the same type as those fully illustrated and described in the United States Patent No. 1,163,748 granted to Frederick L. Fuller on December 14, 1915, and but a very brief description of them will be necessary here.

There are five transaction front indicators 575 (Fig. 10) and five transaction back indicators 576 all mounted in a carriage 577 having a rack 578 meshing with a segment 579 secured to the segment 412 which, as previously stated is set differentially under the control of the transaction keys 119. The differential setting of this segment 412 is, through the segment 579 and rack 578, imparted to the carriage 577, which causes the proper indicators 575 and 576 to be positioned opposite the points 580 and 581 respectively in the cabinet so that they may be raised to expose the indicia thereon to view.

The mechanism for raising these indicators is not shown or described in this application, and for a description thereof reference may be had to the last mentioned Fuller Patent No. 1,163,148.

There are four clerks' front indicators 582 (Fig. 8) and four clerks' back indicators 583 all supported in a carriage 584 having a rack 585 meshing with a segment 586, integral with the indicator segment 462. This segment 462 is moved differentially under control of the clerks' keys 118 and, through the rack 585 and carriage 584 positions the clerks' indicators 582 and 583 opposite the points 587 and 588 so that they may be raised to expose the indicia thereon toward the front and the back of the machine. The means for raising the clerks' indicators is not shown or described because it is the same as that shown and described in the Fuller Patent No. 1,163,748.

None of the amount indicators are shown in this application as they are substantially the same as those shown in the above mentioned Fuller and Shipley patents. It is thought sufficient to state here that the previously described amount indicator segment 397 has a segment 589 (Fig. 5) meshing with the teeth of an amount indicator carriage (not shown) similar to the carriages 577 and 584.

Special counters

This machine has twelve special counters, five for the transactions, four for the clerks, one for the items, one for item totals, and one for the total number of transactions. Generally speaking, the special counters operate as follows: The clerks', cash and charge counters add the sales only and not the items. The received-on-account, paid-out and no-sale counters each add their own transactions. Whenever the cash or charge counter is operated, the selected clerk's counter is also operated. Whenever the received-on-account, paid-out and no-sale counters are operated, the selected clerk's counter does not operate. In order to properly add sales on the clerk's and the cash and charge counters, they add when single items are entered, but on a multiple item transaction the clerk's and cash or charge counters add one when the item totalizer is cleared and not when the items of the multiple item transaction are entered.

One is added to the item counter when each item of a multiple item transactions is entered, but the item counter does not add when the item totalizer is cleared. The item total counter adds only when the item totalizer is cleared. The total transaction counter adds on all adding registrations, but does not add when taking totals of any kind.

All of the counters are rendered ineffective whenever a total or sub-total is taken from any of the clerks' or transaction totalizers.

Special counters—transaction

The five transaction counters 595 (Figs. 1 and 24) are of the usual rotation type, and it is, therefore, not necessary to describe them specifically in detail. They are supported in a frame 596 mounted upon the rods 122 and 151. Each counter has an operating frame 597 carrying a differentially tined pawl 598. Connected to the frame 597 is a link 599 pivoted to a slotted link 600 guided by a pin 601 on an actuating bar 602 supported by arms 603 and 604 pivotally supported on the frame 596. The actuating bar 602 has a slot for each counter 595 into which projects a connecting pin 605 for the links 599 and 600.

By means to be hereinafter described, the actuating bar 602 is moved downwardly, whereupon the pin 605 is carried downwardly thus tending to straighten the toggle formed by the links 599 and 600. If the link 600 meets with an obstruction (to be hereinafter described) it is stopped from sliding on the pin 601, consequently causing the link 599 to be moved forwardly and rock the frame 597 which causes the pawl 598 to operate the counter. If there is no obstruction placed in the path of movement of the link 600 it will slide on the pin 601, and there will be no movement of the link 599 and consequently no rocking of the frame 597, and therefore there will be nothing added upon the special counter.

Special counters—clerks

The four clerks' special counters 610 (Figs. 1 and 24) are supported in the frame 596. They are identical with the transaction counters 595, just described, and are operated by links 599 and 600, which links are operated in identically the same manner and by the same actuating bar 602 that operates the transaction counter links.

Special counters—item and item total

There is an item counter 611 and an item total counter 612 (Figs. 1 and 27) supported by a frame 613 mounted on the rods 122 and 123. These counters are also identical with the clerks' and transaction counters just described, and are operated by links 599 and 600. In this case the links 599 and 600 are operated by an actuating bar 614 supported by arms 615 and 616 pivoted on the frame 613. The means for operating this actuating bar 614 will be later described.

Special counters—total transaction

There is one total transaction counter 617 (Figs. 1 and 27) supported by the frame 613 and operated by links 599 and 600, which are operated by the actuating bar 614. This total transaction counter counts the number of items entered into the machine including all items of single item transactions and each item of multiple item transactions.

Special counters—operating mechanism

The special counter actuating bars 602 and 614 are operated by the following mechanisms:

The gear 74 (Fig. 3) has a cam 620, which operates a pitman 621 connected to an arm 622 fast on a shaft 623. This shaft 623 also has secured thereto an arm 624 (Fig. 24) having an opening 625 with an offset 626 into which projects a pin 627 on a link 628 (Figs. 24 and 25). The link 628 is pivoted to a lever 629 loosely mounted upon the shaft 269. Also loosely mounted upon the shaft 269 is an arm 630 having pivoted, at 631, thereon a coupling link 632 having a notch 633 adapted to engage a pin 634 on the lever 629. This coupling link 632 is normally disengaged from the pin 634. The arm 630 has a fork 635 engaging a pin 636 on an arm 637, integral with the lower supporting arm 604 for the counter actuating bar 602.

When the coupling link 632 is engaged with the pin 634, to couple the lever 629 and arm 630, counter-clockwise movement of the shaft 623 and arm 624 by the pitman 621, through the link 628 rocks the lever 629 and arm 630 counter-clockwise, thus rocking the supporting arm 604 clockwise and lowering the counter actuating bar 602 to operate the links 599 and 600 so that the selected special counter either of the clerks' group or the transaction group will be operated by the associated pawl 598. The lever 629 also has a pin 638 (Figs. 24 and 25) engaged by the lower arm of a bell crank 639 loosely pivoted on a rod 640 supported by the machine frame. The upper arm of the bell crank 639 engages an arm 641 loosely mounted on a rod 642 supported by the machine frame. The arm 641 is integral with an arm 643 (Fig. 27) connected by a pin 644 to the upper supporting arm 615 for the counter actuating bar 614.

The lever 629 is rocked counter-clockwise and then clockwise by the cams 620 (Fig. 3) on every rotation of the cam shaft 57. This counter-clockwise movement of the lever 629 rocks the bell crank 639 clockwise, which, through the arms 641 and 643, moves the counter actuating bar 614 toward the left (Fig. 27) to operate the links 599 and 600 for the counters 611, 612 and 617, so that the ones which have been selected for operation will be actuated by their associated pawls 598.

When the lever 629 is moved clockwise to its normal position the bell crank 639 is moved counter-clockwise, thus causing the actuating bar 614 to be moved to its normal position.

*Special counter selecting mechanism for clerks and transaction*

Connected to the clerks' indicator segment 462 and arm 464 by the sleeve 465 is an arm 650 (Figs. 7 and 24) having connected thereto a link 651 also connected to a counter selecting arm 652 loosely mounted upon the rod 640. Pivoted to the arm 652 is a stop arm 653 carrying a pin 654 normally resting upon an L-shaped control arm 655 supported by an arm 656 secured to a shaft 657 and a lever 658 pivoted on a stud 659. A toe 669 of the lever 658 is normally held against a toe on the lever 629 by a spring 668 connected to the arm 656.

The differential positioning of the clerks' indicator segment 462 is communicated to the clerk's counter selecting arm 652 and the stop arm 653 is moved beneath one of the links 600, depending upon the clerks' key depressed.

With the stop arm 653 underneath the selected link 600, when the counter actuating bar 602 is moved downwardly, the stop arm 653, by reason of the fact that the pin 654 lies against the edge of the control arm 655, forms an obstruction for the link 600, thus preventing it from sliding on the pin 601, and therefore, as the counter actuating bar 602 is moved downwardly the link 599 is moved forwardly and rocks the frame 597 and its pawl 598 adds "one" upon the selected special counter.

Secured to the shaft 399 (Figs. 7 and 24) which is set differentially under the control of the transaction keys 119, is an arm 660 having connected thereto a link 661 also connected to a selecting lever 662. This lever 662 carries a stop arm 663 having a pin 664 which normally rests upon a stop arm control bar 665 secured to the machine frame.

The differential positioning of the shaft 399 is communicated to the counter selecting lever 662 and the stop arm 663 is set beneath the link 600 associated with the depressed key so that when the counter actuating bar 602 is moved downwardly, the stop arm 663 forms an obstruction for the link 600, and the link 599 is moved forwardly and the associated pawl 598 adds "one" upon the selected transaction counter.

As previously stated, when the cash or charge special counter is selected, the selected clerk's counter must also be operated, but when the received-on-account, paid-out or no-sale special counter is selected then the selected clerk's counter must not be operated, and its operating means is rendered ineffective by means which will now be described.

The control arm 655 has a projection 666 cooperating with a pin 667 on the counter selecting lever 662 to hold the control arms 655 in the position shown. When the cash or charge counter is selected, the pin 667 will remain beneath the projection 666. When the received-on-account, paid-out or no-sale key is depressed, the counter selecting lever 662 is moved counter-clockwise and the pin 667 is moved from beneath the projection 666.

When the pin 667 has been moved from beneath the projection 666 a spring 668 attached to the arm 656 moves the control arm 655 toward the shaft 640 when the lever 629 is moved counter-clockwise and moves its toe from the toe 669 of the lever 658.

When the control arm 655 has been moved as just described, when the counter actuating bar 602 moves the links 559 and 600, the link 600 will rock the stop arm 653 clockwise (provided it has not already done so by gravity) since the control arm 655 has been moved away from the pin 654, and, therefore, said stop arm will form no obstruction for the link 600, and said link will slide upon the pin 601 and the link 599 will not be moved forwardly, therefore, nothing will be added upon the selected clerk's counter.

Special counters—selecting mechanism for items, item total and total transaction counters Associated with the special counters 611, 612 and 617 is counter selecting arm 670 (Fig. 27) loosely mounted upon the shaft 640. This arm has a lug 671 normally in position to form an obstruction for the link 600 associated with the total transaction counter so that upon every operation of the machine (except total and sub-total operations) the link 600 is prevented from sliding, thereby causing the link 599 to be moved forwardly to make its pawl 598 operate this special counter 617.

This counter selecting arm 670 also has a projection 672 associated with the item total counter 612, but normally in such a position that it will not form any obstruction for the link 600 associated with that counter.

The means for moving the selecting arm 670 and projection 672 so that said projection will cause the item total counter 612 to operate will now be described. Pivoted to the counter selecting arm 670 is a link 673 also pivoted to an arm 674 loosely mounted upon the shaft 250. Secured to this shaft 250 is an arm 675. The two arms 674 and 675 are connected by a torsion spring 676 and normally held in the positions shown in Fig. 27. The shaft 250 is rocked clockwise by the total lever 120, and is also given a further movement, as will be later described, during all total and sub-total operations.

When the total lever 120 is moved to the "item total" position, the first clockwise movement of the shaft 250 rocks the arm 675 clockwise, and through the spring 676 the arm 674 is rocked clockwise and the link 673 moves the counter selecting arm 670 clockwise and positions the projection 672 beneath the link 600 for the item total counter. Now, when the counter actuating bar 614 is moved toward the left the projection 672 prevents the link 600 from sliding, and the link 599 is moved forwardly, whereby its pawl 598 adds "one" upon the item total counter.

A pin 677 (Fig. 27) cooperates with an extension 678 of the arm 674 so that during the second clockwise movement of the shaft 250, the arm 678 will not be moved any farther than it was moved by the spring 676 upon the initial movement of the shaft 250 by the total lever; the second movement of the shaft 250 merely moves the arm 675 and tensions the spring 676 but does not move the arm 674, due to the stop pin 677.

Pivoted on the counter selecting arm 670 is an auxiliary counter-selecting arm 680 having a projection 681 and a pin 682. The projection 681 is normally in a position to form an obstruction for the link 600 associated with the item counter 611 so that when the counter actuating bar 614 is moved, this counter will have 1 added upon it when the auxiliary counter-selecting arm 680 and projection 681 are permitted to remain in the positions shown in Fig. 27.

During the entry of a "received on account", or "paid out" amount, or during a "no sale" operation, the item counter 611 is not operated.

As above described, during the above named operations, the counter selecting lever 662 (Fig. 24) is rocked counter-clockwise, the pin 667 is moved from beneath the projection 666, and the control arm 655 is moved by the spring 668. Upon the movement of the control arm 655, its supporting arm 656 moves clockwise and rocks the shaft 657 likewise. To this shaft 657 is secured an arm 685 (Fig. 27) connected by a link 684 to the control arm 683. Therefore, the clockwise movement of the shaft 657 is, through the link 684, imparted to the control arm 683, and a beveled edge 686 thereof is brought beneath the auxiliary counter-selecting arm 680, thus permitting the latter arm to rock clockwise, by gravity. With the parts in these positions, when the link 600 associated with the item counter 611, is moved by the counter actuating bar 602, the projection 681 on the auxiliary counter-selecting arm 680 will not act as an obstruction for said link 600, consequently the link will slide on the pin 601, and the link 599 for the item counter 611 will not be moved to operate said counter.

Special counters—operating mechanism control

The mechanism for engaging the coupling link 632 (Figs. 24 and 25) with the pin 634 so that the clerk's and transaction counters will be operated at the proper time, and for rendering both the clerks' and transaction counter operating mechanism ineffective when the machine is set for taking a total or sub-total operation will now be described.

Whenever the operating mechanism for the clerks' and transaction counters is rendered entirely ineffective, then the operating mechanism for the item counter, the item total counter and the total transaction counter is also rendered ineffective. This mechanism will also be described under the above heading.

As previously stated, during the entry of a single item, the cam 307 (Fig. 17) rocks the shaft 311 and the bell crank 314 (Fig. 30) clockwise, and then counter-clockwise. It will be remembered also that the pawl 315 rocks the arm 305 (Fig. 32), clockwise and the arm 300 is rocked likewise by the roller 302.

Integral with the arm 300 is an arm 690 (Fig. 32) to which is pivoted a link 691 also connected to an arm 692 loosely mounted upon the shaft 623. The arm 692 is connected by a yoke 693 to an arm 694 (Fig. 24)

having pivoted thereto a link 695 pivoted to an arm 696 (Fig. 25) secured to the shaft 250. Loose upon the shaft 250 is a lever 697 having a slot 698 engaging a pin 699 on the coupling link 632. The lever 697 has a pin 700 normally held against the arm 696 by a torsion spring 701.

When the arm 300 and shaft 290 are rocked clockwise by the bell crank 314 and pawl 315 (Fig. 32) the link 691 rocks the arm 692 and through the yoke 693, rocks the arm 694 (Fig. 24) clockwise, thus raising the link 695 and rocking the arm 696 clockwise (Fig. 25). The spring 701 then rocks the lever 697 clockwise, which through the slot 698 and pin 699 engages the notch 633 of the coupling link 632 with the pin 634 on the lever 629, so that when said lever is rocked counter-clockwise it will rock the arm 630 to operate the special counter actuating bar 602 (Fig. 24).

During a multiple item sale the transaction and clerk's special counters are not to be operated during the entry of the several items of this multiple item transaction. Therefore, the coupling link 632 is permitted to remain disengaged from the pin 634 at this time. The means for permitting this disengagement is the pawl 315 (Fig. 30) which it will be remembered is rocked counter-clockwise by the pin 318 when the item key 116 is depressed. This, as previously stated, moves the pawl 315 out of the path of the projection 306 on the arm 305. Consequently, when the cam 307 (Fig. 17) rocks the shaft 311 and bell crank 314, the arm 305 will not be moved, and therefore the train of mechanism from the arm 690 to the lever 697 will not be moved, and the coupling link 632 will be permitted to remain in the position shown in Fig. 25.

When the total of these items is taken, the selected clerk's and transaction totalizers must be operated to count "one" so that the proper number of sales may be determined. This is accomplished in the following manner:

Since the arm 696 (Fig. 25), is rigidly mounted on the shaft 250, the clockwise movement thereof, by the total lever, causes the lever 697 through its slot 698 and the pin 699 to engage the coupling link 632 with the pin 634, and when the lever 629 is rocked by the cam 620 (Fig. 3) the counter actuating bar 602 will be operated to cause the selected counters to add.

The above connection between the coupling links 632 and the lever 629 takes place only during the first cycle of movement of the cam shaft 57 during the item total operation.

During the second cycle of the cam shaft 57 during the item total operation, while the coupling link 632 remains in engagement with the lever 629, certain mechanism, hereinafter described, prevents any movement of the lever 629 and consequently any operation of the special counters.

Secured to the shaft 250 is an arm 702 (Fig. 24) carrying a pin 703 which projects laterally underneath the operating link 628. When the shaft 250 is moved by the total lever, this pin 703 is moved to a position just tangent to the underside of the link 628. When the shaft 250 is moved clockwise a further distance, by means to be hereinafter described, the pin 703 rocks the link 628 with its upper connecting point as the pivot, and disengages the pin 627 from the offset 626 in the arm 624, and when this arm 624 is rocked counter-clockwise, during the second cycle of the shaft 57, it will have no effect upon the link 628 and consequently the counter operating lever 629 will not be operated and, therefore, the clerk's and transaction special counters will not be operated.

When the total lever is moved to either of the two positions above the adding position or to the second or third position below the adding position, there is another means for disconnecting the pin 627 from the offset 626. The link 628 (Fig. 22) has a pin 704 beneath which rests one arm of a bell crank 705, the other arm of which carries a pin 706 which cooperates with an arm 707, moved directly by the total lever, as will be hereinafter described. This arm 707 has two lugs 708 (Fig. 21) forming a notch 709. When the pin 706 (Fig. 22), is cooperating with the notch 709, the bell crank arm 705 is in the position shown in Fig. 22 just below the pin 704. When the total lever is moved to any of the positions just above mentioned, one of the lugs 708 engages the pin 706 and rocks the bell crank 705 clockwise, thus rocking the link 628 and disengaging the pin from the offset 626 which renders the operating lever 629 ineffective.

During the first cycle of movement of the shaft 57 for a total or sub-total operation, except an item total, it is necessary to move the projection 306 of the arm 305 out of the path of movement of the pawl 315. This is accomplished in the following manner:

The previously described link 303 (Fig. 32) is pivoted to an arm 710 rigid on the shaft 250. The first movement of the shaft 250 by the total lever draws the link 303 downwardly, which, by means of the pin 302 and slot 304 rocks the arm 305 clockwise, thus moving the projection 306 out of the path of movement of the pawl 315.

This movement also takes place during the first cycle of movement of an item total operation, but since during an item total operation the pawl 315 is in an ineffective position, said pawl 315 having been moved to such ineffective position by the depression of the item key 116.

Printer

Since the printing mechanism used with the mechanism illustrated in this case, is substantially the same as that described in the above mentioned Shipley application Serial No. 687,305 said printing mechanism has not been completely illustrated in this case.

The only part of the printing mechanism disclosed in this case is that part controlled by movement of the total lever to print the characters X and Z, depending upon whether the lever has been moved to take a total or a sub-total of the totalizers. This mechanism will now be described.

Pivoted to the total lever 120 (Fig. 18) is a link 715 the other end of which is pivoted to an arm 716 (Fig. 21) loosely mounted upon a rod 717. The arm 716 is connected to an arm 718 having pivoted thereto a link 719 connected to a type wheel setting segment 720 meshing with a segment 721 rigid with a type wheel 722.

By means of the above connections, when the total lever is moved to either of the two positions above the adding position, a letter "X" is printed, and when the total lever is moved into the second or third position below the adding position a letter "Z" is printed. The usual form of an aligner 723 is shown cooperating with an aligning segment 724 rigid with the segment 721 and type wheel 722.

It is the link 715, arms 716 and 718 and link 719 which operate and control the setting of the previously described arm 707 for rendering the special counter operating mechanism ineffective when the total lever is moved into the positions just described to take a total or sub-total from either the clerks' or the transaction totalizers.

Item total, total, and sub-total

During an item total operation, a total operation or a sub-total operation, it is necessary that the cam shaft 57 be given two rotations instead of one. To accomplish this the total lever 120 has a slot 725 (Fig. 18) engaged by a pin 726 of a lever 727 pivoted at 728. Also pivoted at the same point is an arm 729 having a cam slot 730 engaged by a roller 731 in an arm 732 fastened on the shaft 250. The lever 727 and arm 729 are connected by a pin and slot connection and have a compression spring 733 which normally holds said arms in the positions shown in Fig. 18.

When the total lever 120 is moved in either direction from the adding position, the slot 725 rocks the lever 727 counter-clockwise, which through the pin and slot connection and spring 733 rocks the arm 729 counter-clockwise. This through the slot 730 and roller 731 rocks the arm 732 and shaft 250 clockwise. Secured to the shaft 250 is an arm 735 (Fig. 3) connected by a link 736 to a lever 737 pivoted upon the stud 101. The lever 737 has pivoted thereto a link 738 having a slot which guides it in its movements over the screw stud 73. The link 738 carries two pins 739, one on each side of a lug 740 on a coupling bar 741, which slides in a slot 742 between the gear 72 and a cam 743 supported by the gear 72 and the stud 73. The link 738 also carries a roller 744 which cooperates with the cam 743. The clockwise movement of the shaft 250 by the total lever moves the link 738 to the left so that the roller 744 will engage the main portion of the cam 743 and at the same time a small end 745 of the coupling bar 741 is moved into a notch 746 in the gear 72, so that when the gear 72 is rotated, the cam 743 will be rotated therewith. This cam 743 rocks the shaft 250, at the proper time, the second time to perform the functions previously described in connection with the control of the special counters.

It will be remembered that during adding operations the engagement of the totalizer lines is controlled by the totalizer selecting disk 556. During total and sub-total operations this disk is not the controlling factor, and the mechanism which cooperates therewith is rendered ineffective by means to be now described.

Connected to the lever 727 is a link 747 (Figs. 18 and 19) also connected to the link 547, which rocks the levers 542 and 545 to control the movements of the clerks' and transaction totalizer lines during adding operations to engage the selected totalizers with the actuators 372.

When the total lever 120 is moved out of adding position, the link 747 is moved toward the right (Fig. 18) thus disconnecting the pin 548 from the hook 549 on the arm 550. Consequently the movement of the cam 553 during totalizing operations has no effect upon the levers 542. To control the movements of these two totalizer lines during totalizing operations, the slots 555 (Fig. 18) into which the pins 554 project, are so formed that one line only can be selected for movement, at a time. This mechanism is all old and well known in this art, and fully illustrated and described in the several Fuller patents and the Shipley patent above mentioned, it being sufficient to state here that the cam slots 555 themselves cause the rocking of the levers 545 to position the pins 525 within the hooks 526 of the totalizer engaging and disengaging spider 527, so that when the spider 527 is rocker the proper one of the totalizer lines will be moved to engage the selected totalizer with the actuators 372 to have the total taken therefrom.

During total and sub-total operations the timing of engagement and disengagement of totalizers is different from that during adding operations. The mechanism for changing the time of the engaging and disengaging is also old and fully illustrated and described in the above mentioned Fuller and Shipley patents and therefore but a very brief description thereof will be given at this time.

During total and sub-total operations the link 530 (Fig. 16) is moved to a different position from that shown in this figure. This is done by the total lever 120, preliminary to an operation of the cam shaft 57 so that the time of the engaging and disengaging of the totalizers may be changed in accordance with the desired operation. When the total lever 120 is moved counter-clockwise for a totalizing operation, a slot 750 rocks a lever 751 clockwise. This occurs at the same time that the lever 727 is rocked counter-clockwise. A link 752 connects the arm 732 with the lever 751 and has a pin extending into a slot 753 of a lever 754.

The clockwise movement of the lever 751 rocks the lever 754 clockwise which, by means of the pin 534, rocks the link 530 counter-clockwise around the point where this lever is connected to the lever 531. This disengages said link 530 from the pin 528 on the totalizer engaging and disengaging spider 527.

The clockwise movement of the lever 754 rocks the lever 755 and a pin 756 thereon enters a locking notch 757 in the spider 527 and positively locks this spider in the proper position until one of the pins 525 has been engaged with one of the hooks 526 of said spider 527.

The movement of the total lever 120 rocks the arm 732 and shaft 250 clockwise but not far enough for the stud in the upper part of the link 752 to engage a cam portion 758 of the slot 753.

After the parts have been moved to the position just described, by the total lever 120, the motor is released to give the shaft 57 two clockwise rotations (Fig. 16).

During the first rotation of the shaft 57 the lever 531 is rocked clockwise and moves the link 530 to the right and positions a notch 759 therein directly above a pin 760 on the totalizer engaging and disengaging spider 527. Immediately after this has taken place, the shaft 250 is moved farther by the cam 743 (Fig. 3) which moves the link 752 downwardly thereby rocking the lever 754 clockwise. This rocks the link 530 and engages the notch 759 with the pin 760. After this engagement, and during the last part of the first rotation of the shaft 57, the lever 531 is rocked counter-clockwise and moves the link 530 to the left, which rotates the spider 527 clockwise. This moves the selected totalizer line into position to engage the selected totalizer with the actuators.

The totalizer is held in engagement with the actuators until said actuators have been differentially positioned under the control of the totalizer pinions 480, after which the lever 531 is rocked clockwise and moves the link 530 to the right, which rocks the totalizer engaging and disengaging spider 527 counter-clockwise thus disengaging the selected totalizer from the actuators.

Immediately after this disengaging of the totalizer, the cam 743 (Fig. 3) rocks the shaft 250 counter-clockwise which raises the link 752 to rock the lever 754 counter-clockwise, thus disengaging the notch 759 from the pin 760. The link 530 is then moved to the left, to the position in which it was placed by movement of the total lever 120.

After the link 530 has been moved to this position the total lever 120 is moved clockwise to its adding position, and the levers 751 and 754 are rocked counter-clockwise, thus rocking the link 530 clockwise about its right hand pivot point so that the notch 529 again engages the pin 528.

From this description it will be seen that the totalizer line selected by the total lever, is rocked into position to engage the selected totalizer with the actuators before said actuators are moved differentially, and the totalizer is held in engagement therewith until the differential movement of the actuators, under the control of the totalizer pinion 480, is completed, after which the totalizer line is rocked to disengage the totalizer from the differential actuators thus leaving the totalizer at zero.

The control of the engaging and disengaging of the totalizer with the actuators during sub-totalizing operations will now be described. For a sub-total operation the total lever 120 is moved clockwise (Fig. 16). This movement of the lever does not rock the lever 751, because the slot 750 is concentric with the rod 266 for all positions of the total lever 120 above adding position. This movement of the lever 120, however, does rock the lever 727 (Fig. 18) which in turn rocks the shaft 250 clockwise.

As the lever 754 (Fig. 16) is not moved by the total lever 120 the link 530 remains in engagement with the pin 528.

During the first clockwise movement of the lever 531, the link 530 rocks the totalizer engaging and disengaging spider 527 clockwise and engages the selected totalizer with the differential actuators. After the totalizer has been so engaged, the cam 743 (Fig. 3) rocks the shaft 250 still farther clockwise which, through the link 752 rocks the lever 754 clockwise, thus disengaging the link 530 from the pin 528 and causing the pin 756 (Fig. 16) to engage a notch 761 in the spider 527 to positively lock this spider in this position, and hold the totalizer in engagement with the actuators.

Immediately after the disengagement of the link 530 from the pin 528, the lever 531 is rocked counter-clockwise and moves the link 530 to the left. This movement of the link 530 is idle because it is not engaged with either of the pins 528 or 760. The actuators are moved differentially under the control of the totalizer pinions 480 thereby resetting the totalizer to zero. As previously described, the amount on the totalizer is now printed by the type wheels, and during the first part of the second rotation of the shaft 57, the differential actuators are again moved, and due to the fact that the totalizer pinions are still in engagement therewith, the amount taken from the totalizer pinions is put back on them. After this the lever 531 is again rocked clockwise and moves the link 530 to the right and positions the notch 529 beneath the pin 528. The cam 743 now moves the shaft 250 counter-clockwise and raises the link 752, which rocks the lever 754 and moves the link 530 to cause the notch 529 to engage the pin 528. After this engagement, the lever 531 is again rocked counter-clockwise to normal and moves the link 530 to the left, thus rocking the totalizer engaging and disengaging spider 527 counter-clockwise to its normal position, which disengages the totalizer from the actuators.

The total lever 120 then is moved counter-clockwise to its normal adding position, and through the lever 727 rocks the shaft 250 counter-clockwise to its normal position.

From the above description it will be clear that during a sub-totalizing operation the totalizer is engaged with the actuators and reset to zero by the movement of the actuators, but said totalizer is maintained in engagement until said actuators are again moved, which operation puts back on the totalizer the amount taken therefrom so that at the end of a sub-total operation the amount on the totalizer is the same as it was before the operation was made.

*Operation—single item entering*

A brief description of an operation of the machine when a single item is entered will now be given.

Let it be assumed that clerk B sells a single item for cash which costs 5 cents. The operator first depresses the 5¢ key 117, then the clerk B key 118, then the cash key 119 and finally depresses the motor bar 80. The depression of the motor bar causes the lever 43 (Fig. 30) to be released from the block 42 on the motor clutch disk 41 whereupon the motor drives the cam shaft 57 one rotation.

The amount differential (Fig. 5) is rotated clockwise by the cams 363 and 364 until it reaches the 5 position; the transaction differential (Fig. 10) is rotated clockwise by its cams 363 and 364 until the differential strikes the cash key 119 in which position it is stopped. The clerks' differential arm 420 (Fig. 8) is moved counter-clockwise until it stops against the B key. The amount differential, through its beam 393, (Fig. 5) sets up the indicators to indicate five cents through the indicator segment 397, and sets up the printing mechanism through the arm 400 to print five cents. The transaction differential through its beam 393 and link 411 selects the cash indicators 575 and 576 and at the same time through the rack 492, slides the rear totalizer line to position the cash totalizer pinions 480 opposite the differential actuators 372.

The clerks' differential mechanism through the indicator segment adjusting lever 446 selects the B indicators 582 and 583, and at the same time through the link 461 and rack 505 slides the front totalizer line to select the B totalizer pinions 480.

After the totalizers have been thus positioned they are rocked into engagement with the differential actuators 372 by the totalizer engaging and disengaging spider 527 (Fig. 16). In this case both totalizer lines are rocked in, because there is a high spot 559 opposite the cash totalizer position and the clerk B's totalizer position on the totalizer selecting disk 556.

After the totalizers have been thus engaged the actuators 372 are restored to normal positions thus adding into both totalizers the amount of five cents which was set upon the keyboard.

During the selection of the cash totalizer the counter selecting lever 662 (Fig. 24) selects the cash counter and the counter selecting arm 652 selects clerk B's counter.

The item counter 611 (Fig. 27) is also operated because the control arm 683 was not moved and consequently the arm 680 was held in the position shown in Fig. 27.

During this operation the counter selecting arm 670 (Fig. 27) was permitted to remain in the position shown and the obstruction 671 caused "one" to be added into the total transaction counter 617.

*Operation—multiple item entry*

For a multiple item entry let it be assumed that the clerk D sold two items for cash each of which cost five cents.

The operator first depresses the item key 116, then the five cent key 117, then the D key 118 and finally depresses the motor bar. The cash key remained depressed from the previous operation.

The depression of the motor bar releases the lever 43 (Fig. 30) the same as during a single item operation, which permits the motor to turn the cam shaft 57 one complete rotation. During this operation the clerk D's totalizer and the cash totalizer are selected in the manner described for the single item operation.

The depression of the item key 116 also positions the arm 571 (Fig. 19) in front of the pin 554. After the totalizers have been selected, all three lines, the upper line, which contains the item totalizer, the front line which contains the clerk's totalizer and the rear line which contains the transaction totalizer, are rocked by the totalizer engaging and disengaging spider 527 into positions to engage the selected totalizers with the differential actuators 372.

After this engagement of the totalizers with the actuators, the amount differentials are restored to normal positions and the amount of five cents is entered into the item totalizer, clerk D's totalizer and the cash totalizer.

The proper indicators and printing characters for the clerk and transaction are selected during this operation, in the manner stated in connection with the single item entering operation.

At the end of this operation the lever 43 is restored to the position shown in Fig. 30 thus stopping the shaft 57.

The item key 116 is not released at the end of this operation but remains depressed because the pawl 315 (Fig. 30) was rocked so that it would not engage the projection 306 of the arm 305 (Fig. 32). Therefore, the restoring lever 282 (Fig. 23) had no effect upon the lever 132.

To enter the second 5¢ item the operator depresses the 5¢ key and the motor bar, the clerks and transaction keys remain depressed from the first operation of this multiple item transaction. The clerk and transaction totalizers and also the item totalizers are selected and engaged in the manner which has been just described.

Now before any other items can be entered into the machine, that is, any other single items for a single item transaction, it is necessary to take the item total of this multiple item transaction. To do this the total lever 120 is moved to the item total position (Fig. 1). This movement of the total lever renders the regular adding operation totalizer engaging mechanism (Fig. 19) ineffective, and causes the slot 555 to directly position the pin 525 associated with the item totalizer into engagement with the hook 526 (Fig. 16) of the totalizer engaging and disengaging spider 527. This movement of the total lever also couples the cam 743 (Fig. 3) to the gear 72. During this operation the shaft 57 receives two rotations, as previously described. The item totalizer is engaged with the differential actuators 372 before they are moved clockwise (Fig. 5) thereby causing them to be set in a position corresponding to the amount which is on the item totalizer. The totalizer is then disengaged therefrom, thus leaving it at zero. After the totalizer has been disengaged, the actuators are restored to normal positions and the amount indicators are set to indicate the total taken from this totalizer. During this item total operation the item counter 611 and the total transaction counter 617 (Fig. 27) are not operated because the shaft 250 rocks the counter selecting arm 670 clockwise and moves the auxiliary counter-selecting arm 680 and the lug 671 out of cooperation with the links 599 and 600 for the item counter 611 and total transaction counter 617, and moves the projection 672 into cooperative relation with the links 599 and 600 associated with the item total counter 612 so that it was operated.

Also during the item total operation the cash and clerk D's counters, which were selected during the entry of the first item, are operated because the movement of the total lever connects up the counter actuating bar 602 which was not permitted to function during the entry of the several items, this being rendered ineffective by the depression of the item key 116 in the manner previously described.

It is not thought necessary to describe the taking of a total or sub-total from the clerks' or transaction totalizers, as these operations were clearly set forth during the description of the total and sub-total controlling mechanisms.

While the form of mechanism herein shown and described is admirably adapted to fulfill the objects primarily stated, it is to be understood that it is not intended to confine the invention to the one form or embodiment herein disclosed for it is susceptible of embodiment in various forms all coming within the scope of the claims which follow.

What is claimed is:

1. In a machine of the class described, the combination of a single bank of keys divided into a plurality of groups, a plurality of counters one for each key, an actuator for each counter, a common driver for all of the actuators, adjustable means controlled by the keys of one group and common to all counters for one group for cooperating with the counter of an operated key to cause the driver to operate the counter, adjustable means controlled by the keys of another group and common to all counters for another group for cooperating with the counter of an operated key in this group to cause the driver to operate the counter, and a member intermediate said adjustable means to render one of said means ineffective when the other of said means is moved into a certain position.

2. In a machine of the class described, the combination of a single bank of keys divided into a plurality of groups, a plurality of counters one for each key, an actuator for each counter, a common driver for all of the actuators, adjustable means controlled by the keys of one group and common to all counters for one group for cooperating with the counter of an operated key to cause the driver to operate the counter, adjustable means controlled by the keys of another group and common to all counters for another group for cooperating with the counter of an operated key in this group to cause the driver to operate the counter, and a device cooperating with both of said means for causing one of them to be ineffective when the other is moved into any one of three of its positions.

3. In a machine of the class described, the combination of a bank of rotation counters divided into two groups, an actuator for each counter, a common driver for all actuators, adjustable means common to all counters of one group for selecting the actuator to be operated, another adjustable means common to all counters of the other group for selecting the actuator to be operated, and a member intermediate said means for causing one of them to be ineffective when the other is moved to a certain position.

4. In a machine of the class described, the combination of a bank of rotation counters divided into two groups, an actuator for each counter, a common driver for all actuators, adjustable means common to all counters of one group for selecting the actuator to be operated, adjustable means common to all counters of the other group for selecting the actuator to be operated, a device cooperating with both of said means, and a projection on said device adapted to engage a pin on one of said means to cause the other adjustable means to be effective.

5. In a machine of the class described, the combination of a bank of rotation counters divided into groups, an actuator for each counter, a common driver for all actuators, adjustable means common to all counters of one group for selecting the actuator to be operated, another adjustable means common to all counters of the other group for selecting the counter to be operated, a device cooperating with both of said means, a projection on said device, and a member on one of said adjustable means and engaging the projection for holding said device in engagement with the other adjustable means when certain counters are selected, said member being disengaged from the projection when certain other counters are selected thus rendering the other adjustable means ineffective.

6. In a machine of the class described, the combination of a bank of rotation counters divided into two groups, an actuator for each counter, a common driver for all actuators, adjustable means common to all counters of one group for selecting the actuator to be operated, adjustable means common to all counters of the other group for selecting the actuator, to be operated, a member intermediate said means for causing one of them to be ineffective when the other is moved to certain positions, another group of special counters, an actuator for each, a common driver for all of the latter actuators, another adjustable means common to all counters of the latter group for selecting one of the actuators for this group, and means operated by said intermediate member for rendering the latter adjustable means ineffective when said adjustable means is moved to a certain position.

7. In a machine of the class described, the combination of a bank of rotation counters divided into two groups, an actuator for each counter, a common driver for all actuators, adjustable means common to all counters of one group for selecting the actuator to be operated, adjustable means common to all counters of the other group for selecting the actuator to be operated, another group of rotation counters, an actuator for each, a common driver for all of the latter actuators, another adjustable means common to all counters of the latter group for selecting one of the actuators for this group, and two members one intermediate the first two adjustable means and one associated with the latter adjustable means said members cooperating one with the other so that the latter adjustable means and one of the first adjustable means are rendered ineffective when the other adjustable means is moved to certain positions.

8. In a machine of the class described, the combination of a counter, actuating means therefor, normally disconnected driving means for the actuating means, a notched lever adapted to connect the two means, means for moving the lever to connect said means, a device for operating the moving means, a manually adjustable member, and means operated thereby for rendering said device ineffective.

9. In a machine of the class described, the combination of a plurality of counters, an actuator for each, driving means for the actuators said means being normally disconnected from one of the actuators and normally connected to another of the actuators, a notched member adapted to connect the driving means and the disconnected actuator, means for moving the member to make such a connection, a device for operating the moving means, a key, means operated thereby for rendering said device ineffective, a manually adjustable member, and means operated by the manually adjustable member for moving the member to make such a connection when said manually adjustable member is moved to a certain position.

10. In a machine of the class described, the combination of a series of keys, a differentially adjustable actuator adapted to be controlled as to the extent of adjustment by said keys, a lever connected to the actuator, a projection on said lever, a driven member pivoted concentric with said lever, an adjustable member intermediate the lever and the driven member, a main operating device, and connections intermediate the main operating device and the adjustable member, for first rocking the adjustable member into engagement with said projection and then causing said adjustable member to slide to a position determined by said projection whereby said driven member is moved to an extent commensurate with the adjustment of the actuator.

11. In a machine of the class described, the combination of a series of keys, a differentially adjustable actuator adapted to be controlled as to the extent of adjustment by said keys, a lever connected to the actuator, a driven member pivoted concentric with said lever, a member adapted to be oscillated and slid, means for oscillating said member to engage it with said lever whereby the member is slid to a position determined by said lever, and means intermediate said oscillating member, and the driven member whereby the driven member is adjusted to a position commensurate with the adjustment of the actuator.

12. In a machine of the class described, the combination of a series of keys, a pivoted actuator common to all of said keys and adapted to be controlled as to the extent of travel by said keys, a lever connected to the actuator, a driven member pivoted concentric with the lever and a member adapted to be oscillated to engage said lever such engagement effecting a sliding movement of the member, whereby said driven member is given an extent of adjustment commensurate to the extent of travel of the actuator.

13. In a machine of the class described, the combination of a series of keys, a pivoted actuator common to all of said keys and adapted to be controlled as to extent of travel by said keys, a lever connected to the actuator, normally disengaged holding means therefor, a driven member pivoted concentric with said lever, normally engaged holding means therefor, a member adapted to be oscillated and slid, means for engaging the holding means with said lever, means for disengaging the other holding means from the driven member, a main operating device, and connections intermediate the main operating device and the oscillating member for first rocking said member into engagement with said projection, and then causing the member to slide to a position determined by said lever, whereby said driven member is moved to an extent commensurate with the adjustment of the actuator.

14. In a machine of the class described, the combination of a series of keys, a differentially adjustable actuator adapted to be controlled as to the extent of adjustment by said keys, a lever connected to the actuator, a driven member pivoted concentric with said lever, a member adapted to be oscillated and slid, a main operating device, and means having a projection engaging a slot in said member for oscillating the member to engage it with said lever, whereby said member is slid to a position determined by said lever, thus causing the driven member to be adjusted to a position commensurate with the adjustment of the actuator.

15. In a machine of the class described, the combination of a series of keys; a rotation counter for each key; a differentially adjustable actuator adapted to be controlled as to the extent of adjustment by said key; a lever connected to the actuator; a projection on said lever; a driven member; counter selecting means adjustable by the driven member; an adjustable lever; a main operating device; and connections intermediate the main operating device and the adjustable lever, for first rocking the adjustable lever into engagement with the projection and then causing said adjustable lever to slide to a position determined by said projection, whereby said driven member is moved to an extent commensurate with the adjustment of the actuator to position the counter selecting means for selecting the counter.

16. In a machine of the class described, the combination of a series of keys; a rotation counter for each key; a differentially adjustable actuator adapted to be controlled as to the extent of adjustment by said keys; a lever connected to the actuator; a projection on said lever; a counter selecting means; an adjustable member; a main operating device; and connections intermediate the main operating device and the adjustable member, for first rocking the member into engagement with said projection and then causing said member to slide to a position determined by the projection, whereby said counter selecting means is moved to an extent commensurate with the adjustment of the actuator as determined by the keys.

17. In a machine of the class described, the combination of a series of keys; a differentially adjustable actuator adapted to be controlled as to the extent of adjustment by said keys; a lever connected to the actuator; a rotation counter for each key; a counter selecting member; a member adapted to be oscillated and slid; means for oscillating said member to engage it with said lever whereby the member is slid to a position determined by said lever; and means intermediate said oscillating member and the counter selecting member, whereby the counter selecting member is adjusted to a position commensurate with the adjustment of the actuator.

18. In a machine of the class described, the combination of a series of keys; a spring-actuated differentially adjustable actuator adapted to be controlled as to the extent of adjustment by said keys; means for latching said differentially adjustable member in its normal position until the machine is released, whereupon the differentially adjustable member is released to the action of its spring until stopped by the depressed key; a lever connected to the actuator; a rotation counter for each key; a counter selecting means; a member adapted to be oscillated and slid; means to oscillate said member to engage it with said lever, whereby the member is slid to the position determined by said lever; and means to adjust the counter selecting means to a position commensurate with the adjustment of the actuator.

19. In a machine of the class described, the combination of a series of keys; a pivoted actuator common to all of said keys and adapted to be controlled as to the extent of travel by said keys; a lever connected to the actuator; a counter for each of said keys; a counter selecting means; and a member adapted to be oscillated to engage said lever, such engagement effecting a sliding movement of the member whereby said counter selecting means is given an extent of adjustment commensurate with the extent of travel of the actuator.

20. In a machine of the class described, the combination of a series of keys; a pivoted actuator common to all of said keys and adapted to be controlled as to extent of travel by said keys; a lever connected to the actuator; normally disengaged holding means therefor; a rotation counter for each of said keys; counter selecting means; normally engaged holding means therefor; a member adapted to be oscillated and slid; means for engaging the normally disengaged holding means with said lever; means for disengaging the normally engaged holding means from the counter selecting means; a main operating device; and connections intermediate the main operating device and the oscillating member, for first rocking said member into engagement with the projection and then causing the member to slide to a position determined by said lever, whereby said counter selecting means is moved to an extent commensurate with the adjustment of the actuator.

In testimony whereof I affix my signature.

SAMUEL BRAND.